US010087786B2

(12) United States Patent
Kiga et al.

(10) Patent No.: US 10,087,786 B2
(45) Date of Patent: Oct. 2, 2018

(54) PLANT CONTROL APPARATUS AND COMBINED CYCLE POWER PLANT

(71) Applicant: KABUSHIKI KAISHA TOSHIBA, Minato-ku (JP)

(72) Inventors: Hikaru Kiga, Yokohama (JP); Masayuki Tobo, Kawasaki (JP); Toyohiro Akebi, Inagi (JP); Keiichi Nakamura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 483 days.

(21) Appl. No.: 14/843,388

(22) Filed: Sep. 2, 2015

(65) Prior Publication Data

US 2016/0076404 A1 Mar. 17, 2016

(30) Foreign Application Priority Data

Sep. 12, 2014 (JP) ................................. 2014-186181

(51) Int. Cl.
*F01K 23/10* (2006.01)
*F01K 7/24* (2006.01)
(Continued)

(52) U.S. Cl.
CPC ............ *F01K 23/101* (2013.01); *F01K 7/165* (2013.01); *F01K 7/24* (2013.01); *F01K 11/02* (2013.01); *Y02E 20/16* (2013.01)

(58) Field of Classification Search
CPC ......... F01K 23/101; F01K 11/02; F01K 7/165
See application file for complete search history.

(56) References Cited

U.S. PATENT DOCUMENTS

| 4,173,124 A | * | 11/1979 | Fujii | ...................... F01K 9/023 |
| | | | | 122/451 R |
| 4,333,310 A | * | 6/1982 | Uram | .................... F01K 23/105 |
| | | | | 60/39.182 |

(Continued)

FOREIGN PATENT DOCUMENTS

| EP | 0 363 979 A2 | 4/1990 |
| EP | 0 363 979 A3 | 4/1990 |

(Continued)

OTHER PUBLICATIONS

Combined Office Action and Search Report dated May 20, 2016 in Taiwanese Patent Application No. 104128632 (with English language translation).

(Continued)

*Primary Examiner* — Mark Laurenzi
*Assistant Examiner* — Shafiq Mian
(74) *Attorney, Agent, or Firm* — Oblon, McClelland, Maier & Neustadt, L.L.P.

(57) ABSTRACT

In one embodiment, a combined cycle power plant includes first and second superheaters to generate first and second main steams, first and second reheaters to heat first and second discharge steams to generate first and second reheat steams, and a steam turbine to be supplied with the merged first and second reheat steams. The plant further includes a first valve to adjust a flow rate of the first discharge or reheat steam, and a second valve to adjust a flow rate of the second discharge or reheat steam. A plant control apparatus includes a determination module to determine a target opening degree of the second valve by using flow rates of the first and second main steams, and a controller to compare the determined target opening degree with a valve opening degree of the second valve and to control the second valve based on a comparison result.

5 Claims, 8 Drawing Sheets

(51) Int. Cl.
*F01K 7/16* (2006.01)
*F01K 11/02* (2006.01)

(56) References Cited

U.S. PATENT DOCUMENTS

| | | | | |
|---|---|---|---|---|
| 4,920,751 | A | * | 5/1990 | Gounder .................. F01K 7/22 60/663 |
| 5,109,665 | A | | 5/1992 | Hoizumi et al. |
| 5,127,470 | A | * | 7/1992 | Inaba ....................... F01K 3/00 122/7 R |
| 5,471,832 | A | * | 12/1995 | Sugita .................. F01K 23/108 60/39.182 |
| 5,628,183 | A | * | 5/1997 | Rice ..................... F01K 21/042 122/7 B |
| 5,887,418 | A | * | 3/1999 | Bruckner .............. F01K 23/103 60/39.182 |
| 6,145,295 | A | * | 11/2000 | Donovan ............. F01K 23/106 60/39.182 |
| 8,539,750 | B2 | * | 9/2013 | Bellows .................... F01K 3/00 60/39.182 |
| 2011/0036096 | A1 | * | 2/2011 | Bommareddy ....... F01K 23/067 60/780 |
| 2011/0225972 | A1 | * | 9/2011 | Bruckner ................ F01K 13/02 60/645 |

FOREIGN PATENT DOCUMENTS

| | | |
|---|---|---|
| JP | 2-104906 | 4/1990 |
| JP | 7-63071 A | 3/1995 |
| JP | 7-324603 | 12/1995 |
| WO | WO 90/08917 A1 | 8/1990 |

OTHER PUBLICATIONS

Extended European Search Report dated Jan. 29, 2016 in Patent Application No. 15184211.9.
Office Action dated Jun. 30, 2016 in Korean Patent Application No. 10-2015-0128734 (with English translation).

* cited by examiner

PLANT CONTROL APPARATUS AND COMBINED CYCLE POWER PLANT

CROSS REFERENCE TO RELATED APPLICATION

This application is based upon and claims the benefit of priority from the prior Japanese Patent Application No. 2014-186181, filed on Sep. 12, 2014, the entire contents of which are incorporated herein by reference.

FIELD

Embodiments described herein relate to a plant control apparatus and a combined cycle power plant.

BACKGROUND

A combined cycle power plant is a power plant configured by combining a gas turbine plant, a heat recovery steam generator (HRSG: Heat Recovery Steam Generator), and a steam turbine plant. In order to recover heat of exhaust gas of a gas turbine, the heat recovery steam generator incorporates a heat exchanger such as a superheater or a reheater. Here, the reheater of the heat recovery steam generator is a tube (heat transfer tube) such as the reheater representatively, and other than that, is a general term of the one composed of various components such as a header, connecting piping or the like, and is called the reheater hereinafter for simplification of description.

A role of the reheater is to generate reheat steam by heat-exchanging discharge steam which is exhaust of a high pressure steam turbine with gas turbine exhaust gas and overheating it. On the other hand, the reheater itself is cooled by the discharge steam passing through the inside. As a result, a temperature of the reheaters is settled, that is, balanced near a temperature of the reheat steam that passes through the inside. Here, the reheat steam becomes the highest temperature generally at an outer side surface part to be in direct contact with the gas turbine exhaust gas.

Then, the highest using temperature of the reheater is selected by imparting a necessary and sufficient margin in consideration of a gas turbine exhaust gas temperature, a flow rate of the reheat steam which is a cooling fluid or the like for an assumed plant operation. In recent examples, the highest using temperature of the reheater is, in many cases, turned to about 550° C. to 600° C. in a heat recovery steam generator combined with a gas turbine having a characteristic that the highest temperature of the gas turbine exhaust gas temperature is 600° C. to 650° C. Then, a plant operation accompanied by the gas turbine exhaust gas temperature exceeding the highest using temperature of the reheater is allowed under a condition that a cooling effect of the reheat steam is demonstrated, under a guarantee of a reheat steam flow rate in particular. A concept of cooling relating to the reheater is similar for the superheater which is the same heat exchanger, and the superheater is cooled by main steam that passes through the superheater.

DETAILED DESCRIPTION

Figure 1:
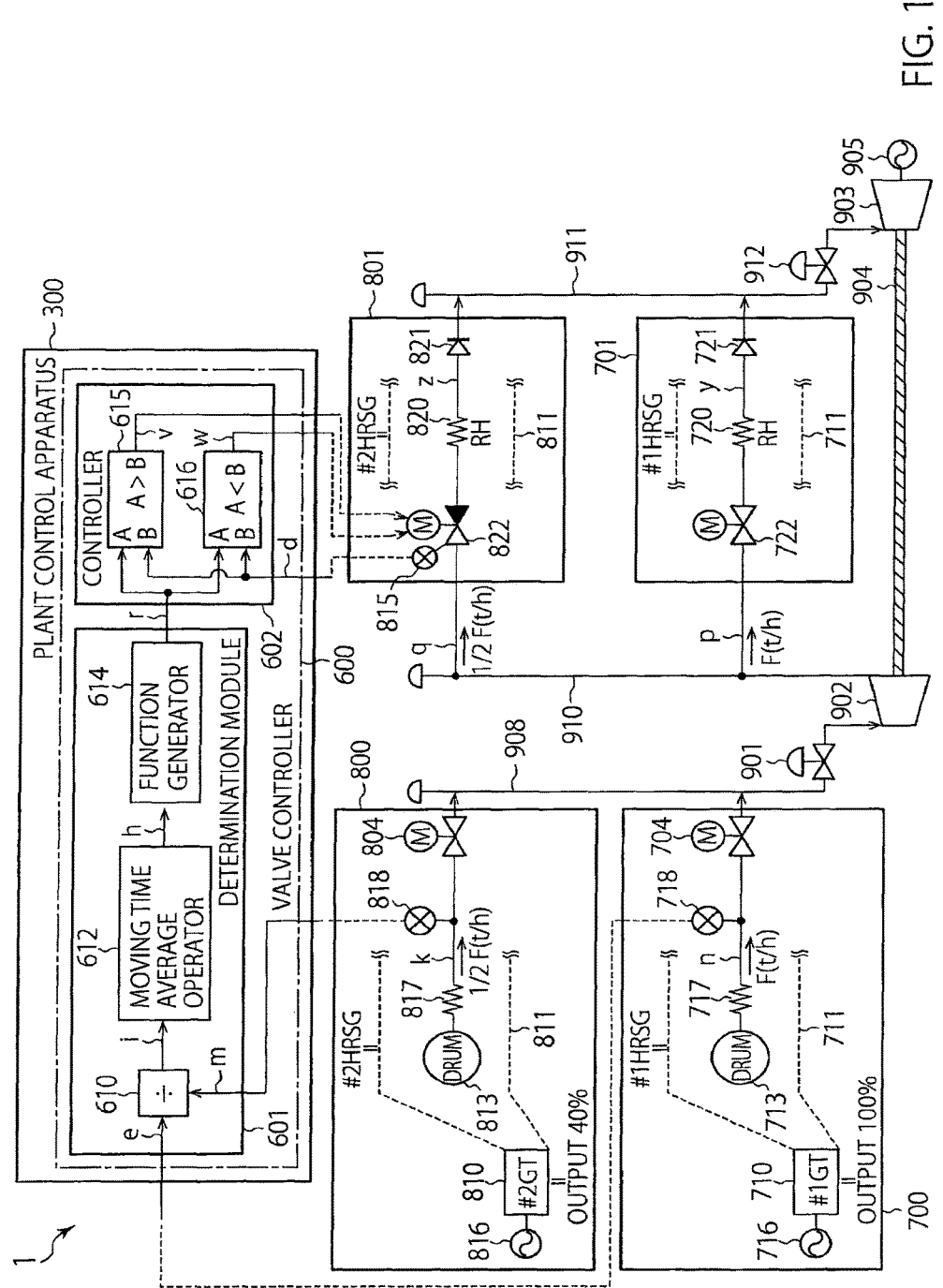
FIG. 1 is a diagram illustrating a configuration of a multiaxial type combined cycle power plant 1 of a 2-2-1 manner relating to a first embodiment.

Embodiments will now be explained with reference to the accompanying drawings.

In a so-called multiaxial type combined cycle power plant, a configuration called a 2-2-1 manner of combining two gas turbines, two heat recovery steam generators and one steam turbine is known. Hereinafter, in the 2-2-1 manner, a power plant consisting of one gas turbine and one heat recovery steam generator is called a first unit, and a power plant consisting of the other gas turbine and the other heat recovery steam generator is called a second unit.

In a normal commercial operation, from a viewpoint of economic efficiency, gas turbine outputs of the first unit and the second unit are both operated at rated 100% output (base load) in most cases. Even in the case that output suppression is demanded due to moderation of power demand, the gas turbine outputs of both units are lowered at the same timing keeping pace with each other, and it is a normal operation condition that the gas turbine outputs of both units coincide as a result. However, in a special case described later, there is a case that unbalanced output that the gas turbine outputs of both units are different is forced. Under the operation, an operation condition is such that the unit (second unit, for example) on a gas turbine output side of the smaller output takes reheat steam from the unit (first unit, for example) on an output side of the gas turbine of the larger output. As a result, a reheat steam amount of the first unit decreases, a flow rate required for cooling a reheater cannot be secured, and a problem that a reheater temperature exceeds a highest using temperature is caused in an extreme case.

In one embodiment, a plant control apparatus is configured to control a combined cycle power plant, and the plant includes a first superheater configured to recover heat of exhaust gas of a first gas turbine to generate first main steam, and a second superheater configured to recover heat of exhaust gas of a second gas turbine to generate second main steam. The plant further includes a first steam turbine configured to be supplied with the first main steam and the second main steam, and a first reheater configured to heat first discharge steam obtained by dividing discharge steam of the first steam turbine to generate first reheat steam. The plant further includes a second reheater configured to heat second discharge steam obtained by dividing the discharge steam of the first steam turbine to generate second reheat steam, and a second steam turbine configured to be supplied with the first reheat steam and the second reheat steam after the first reheat steam and the second reheat steam are merged. The plant further includes a first valve configured to adjust a flow rate of the first discharge steam supplied to the first reheater or the first reheat stream discharged from the first reheater, and a second valve configured to adjust a flow rate of the second discharge steam supplied to the second reheater or the second reheat stream discharged from the second reheater. The apparatus includes a determination module configured to determine a target opening degree of the second valve by using a flow rate of the first main steam and a flow rate of the second main steam, and a controller configured to compare the determined target opening degree with a valve opening degree of the second valve and to control the second valve based on a comparison result.

Comparative Example

Before describing a control apparatus relating to the present embodiment, an operation of a combined cycle power plant relating to a comparative example will be described, and the object and details of a problem will be described. Hereinafter, all numerical values used in this specification are examples for convenience of description.

Figure 7:
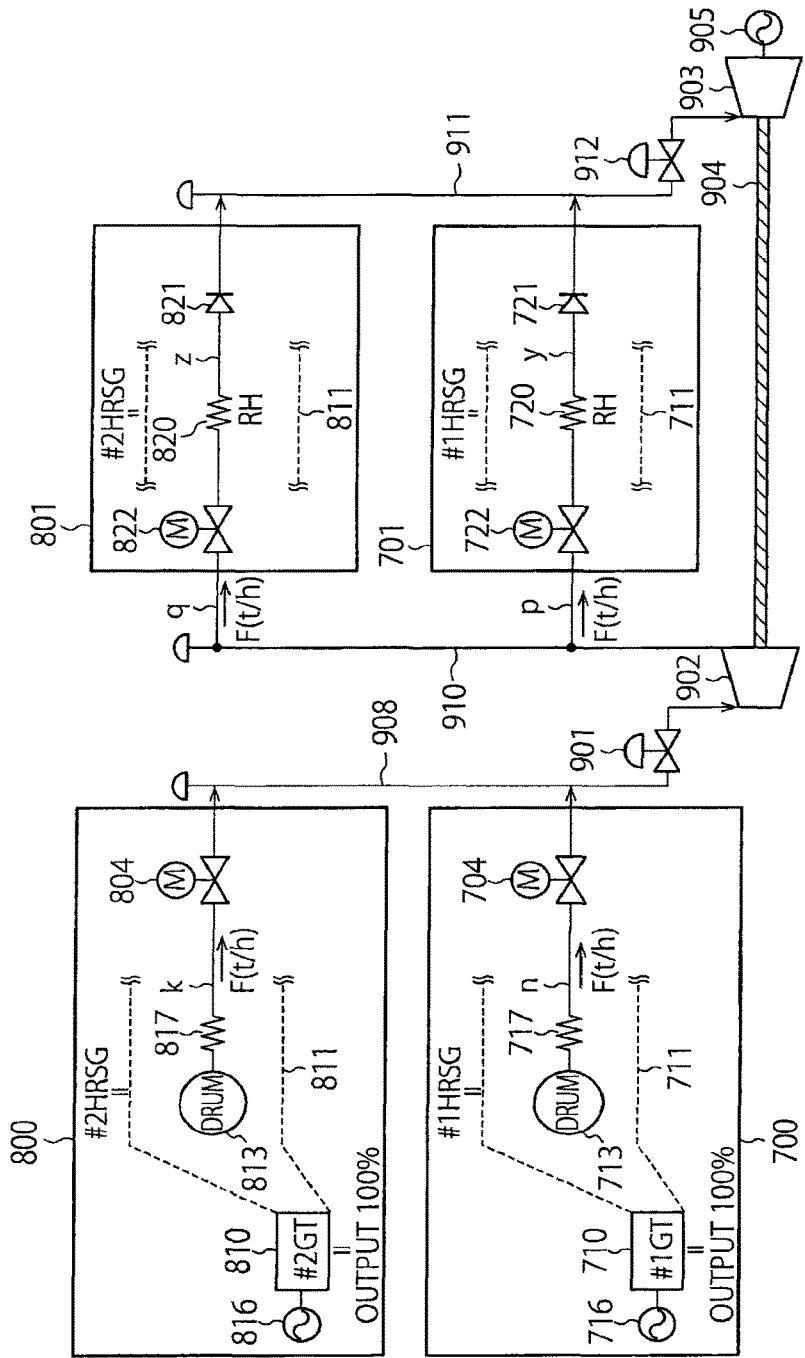
FIG. 7 is a diagram illustrating a configuration example of a multiaxial type combined cycle power plant of the 2-2-1 manner relating to a comparative example.

FIG. 7 is a diagram illustrating a configuration example of a multiaxial type combined cycle power plant of a 2-2-1 manner relating to the comparative example. As illustrated in FIG. 7, the multiaxial type combined cycle power plant of the 2-2-1 manner relating to a first comparative example includes first units 700 and 701, second units 800 and 801, a high pressure steam header 908, a regulating valve 901, a high pressure steam turbine (first steam turbine) 902, a low pressure steam turbine (second steam turbine) 903, an intercept valve 912, an axle 904, and a generator 905.

As illustrated in FIG. 7, the first unit 700 includes a generator 716, a first gas turbine 710, a heat recovery steam generator 711, a drum 713, a first superheater 717, and a high pressure isolation valve 704. Also, similarly, the second unit 800 includes a generator 816, a second gas turbine 810, a heat recovery steam generator 811, a drum 813, a second superheater 817, and a high pressure isolation valve (third valve) 804.

The heat recovery steam generator 711 of the first unit 700 recovers heat of exhaust gas of the first gas turbine 710, and generates steam from the built-in drum 713. The steam is heated by the first superheater 717, and first main steam "n" is generated.

The heat recovery steam generator 811 of the second unit 800 similarly recovers heat of exhaust gas of the second gas turbine 810, and generates steam from the built-in drum 813. The steam is heated by the second superheater 817, and second main steam "k" is generated.

The first main steam "n" from the first unit 700 and the second main steam "k" from the second unit 800 are sent to the high pressure steam header 908 through the high pressure isolation valves 704 and 804 respectively. The main steam "n" and the main steam "k" are merged in the high pressure steam header 908, then pass through the regulating valve 901, are supplied to the high pressure steam turbine 902, and drive the high pressure steam turbine 902.

The main steam "n" and the main steam "k" become discharge steam in a low pressure and low temperature state by driving the high pressure steam turbine 902. The discharge steam is exhausted from the high pressure steam turbine 902, and sent to a discharge steam header 910. Since the first unit 701 and the second unit 702 are branched from the discharge steam header 910, the discharge steam is divided into first discharge steam "p" of the first unit and second discharge steam "q" of the second unit respectively.

A first reheater 720 built into the heat recovery steam generator 711 of the first unit generates first reheat steam "y" by recovering the heat of the exhaust gas of the first gas turbine 710 and heating the first discharge steam "p". Similarly, a second reheater 820 built into the heat recovery steam generator 811 of the second unit generates second reheat steam "z" by recovering the heat of the exhaust gas of the second gas turbine 810 and heating the second discharge steam "q".

The first reheat steam "y" of the first unit and the second reheat steam "z" of the second unit are sent to a reheat steam header 911 through check valves 721 and 821 respectively. The first reheat steam "y" of the first unit and the second reheat steam "z" of the second unit are merged in the reheat steam header 911, pass through the intercept valve 912, are supplied to the low pressure steam turbine 903, and drive the low pressure steam turbine 903.

Steam exhausted from the low pressure steam turbine 903 after driving the low pressure steam turbine 903 is led to a steam condenser (not shown in the figure), cooled and returned to condensed water. As another configuration example, there is the one in which the steam exhausted from the low pressure steam turbine drives the low pressure steam turbine further and is then led to the steam condenser.

Between the first and second superheaters 717 and 817 and the high pressure steam header 908, the high pressure isolation valves 704 and 804 that are motor-operated valves are installed respectively. Also, between the discharge steam header 910 and the first and second reheaters 720 and 820, CRT (Cold ReHeat: low temperature reheat) isolation valves 722 and 822 that are motor-operated valves are installed respectively. All four of the high pressure isolation valves 704 and 804 and the CRT isolation valves 722 and 822 are fully open at a 100% opening degree.

When strictly describing a relation between a main steam flow rate (t/h) and a discharge steam flow rate (t/h), a part of the main steam is consumed and lost as an auxiliary steam source or a turbine ground steam source not shown in the figure and then becomes the discharge steam. Therefore, when the main steam flow rate is defined as F (t/h), the discharge steam flow rate becomes F−ε (t/h). However, the loss is little, and in this specification, the small amount ε is approximated as zero, the discharge steam is defined as F (t/h), and the description is given below.

FIG. 7 illustrates an operation situation that both of the first and second gas turbines 710 and 810 of the first unit and the second unit are operated at the rated 100% output. Since the first gas turbine 710 of the first unit 700 is at the rated 100% output, a large amount of gas turbine exhaust gas at a high temperature is received, and a flow rate of the main steam "n" generated by the heat recovery steam generator is F (t/h).

Similarly, since the second gas turbine 810 of the second unit 800 is also at the rated 100% output, a flow rate of the main steam "k" is the same F (t/h). Since it is gathered to drive the high pressure steam turbine 902, and is then equally divided, the first discharge steam "p" and the second discharge steam "q" are F (t/h) respectively. In this way, since the first discharge steam "p" and the second discharge steam "q" at the sufficient flow rate of F (t/h) pass through the first and second reheaters 720 and 820 respectively, there is no trouble in cooling the first and second reheaters 720 and 820.

Figure 8:
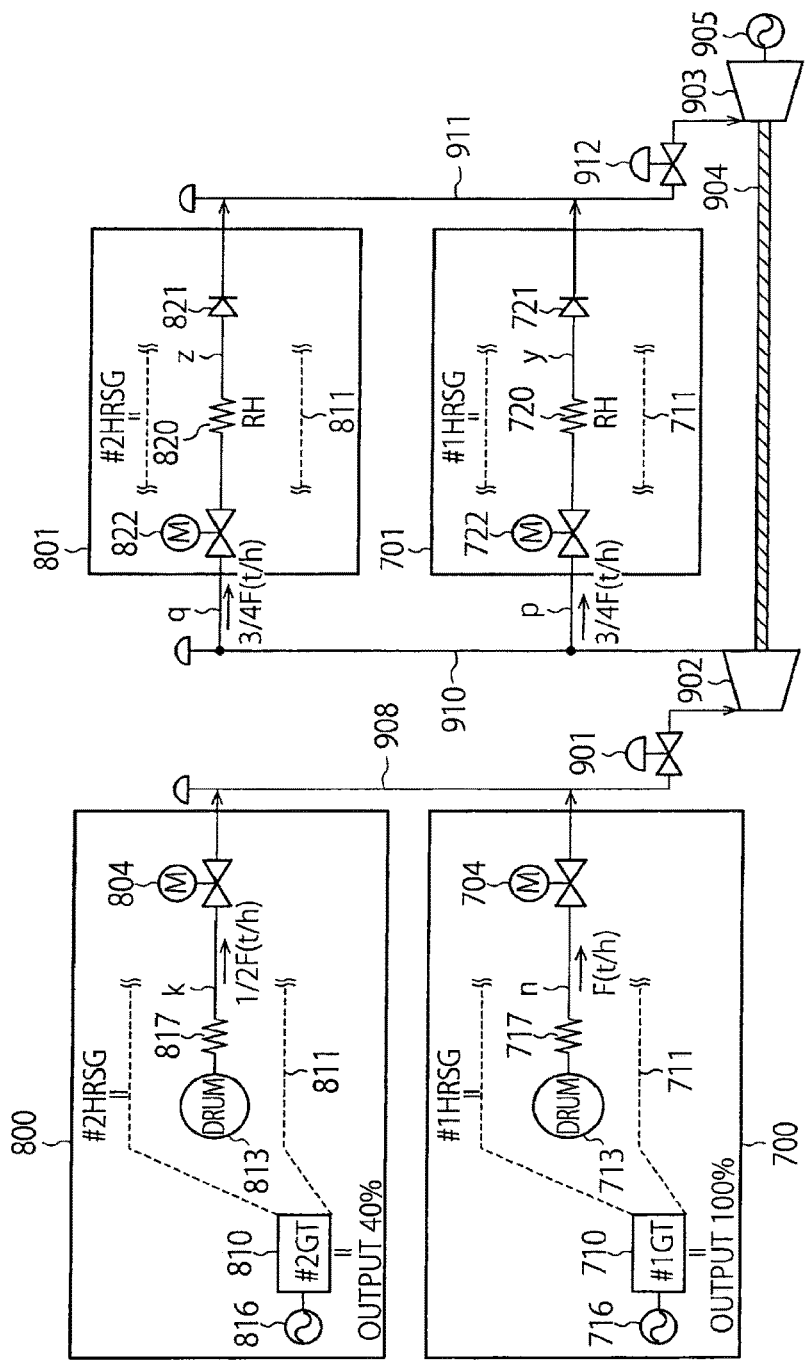
FIG. 8 is a diagram for illustrating a steam flow rate in an unbalanced output state of the multiaxial type combined cycle power plant of the 2-2-1 manner relating to the comparative example.

Next, using FIG. 8, a steam flow rate in an unbalanced output state of the multiaxial type combined cycle power plant of the 2-2-1 manner relating to the comparative example will be described. FIG. 8 is a diagram for describing the steam flow rate in the unbalanced output state of the multiaxial type combined cycle power plant of the 2-2-1 manner relating to the comparative example. As illustrated in FIG. 8, while the first gas turbine 710 of the first unit 700 keeps the rated 100% output, the second gas turbine 810 of the second unit 800 is at 40% output of a partial output state. In this way, the first gas turbine 710 of the first unit 700 and the second gas turbine 810 of the second unit 800 are operated in the unbalanced output state.

It is a special case that the output of only the second gas turbine 810 of the second unit 800 is lowered and becomes partial output in this way. A representative example of an operation condition like this is a case that, as a result of a fault that occurs in the second gas turbine 810 of the second unit, a 100% rated operation is not allowed for security and load runback of reducing gas turbine output to the partial output of a safe zone is operated.

In the heat recovery steam generator 811, it is assumed that, as a result of reduction in supply heat sources of the exhaust gas accompanying output decline of the second gas turbine 810 of the second unit 800, a steam amount generated from the drum 813 of the second unit 800 is lowered, and the flow rate of the main steam "k" becomes ½F (t/h) as an example.

This value ½F (t/h) of the flow rate of the main steam "k" is for convenience of the description, and in actual plant heat balance, even when the gas turbine output becomes 40%, the main steam flow rate may not become a half.

At the time, since the total flow rate of the discharge steam that flows into the discharge steam header 910 is equal to a total value of the main steam "n" and the main steam "k", the total flow rate is F+½F (t/h)=3/2F (t/h). Since a half each of the total flow rate flows into the first and second reheaters 720 and 820 of the individual units, the first discharge steam "p" that flows into the first reheater 720 of the first unit is ¾F (t/h), and the second discharge steam "q" that flows into the second reheater 820 of the second unit is also the flow rate of ¾F (t/h).

A reason that a half each flows equally in this way will be described below. Generally, it is known that a flow rate of a fluid passing through a valve body depends on a differential pressure of an entrance pressure (primary pressure) and an exit pressure (secondary pressure) of the valve, that is, a valve differential pressure.

Regarding the CRH isolation valves 722 and 822 of the first unit 701 and the second unit 801 in FIG. 8, the primary pressure of the valve is equal since it is a pressure of the discharge steam header 910 in both units, and the secondary pressure is also substantially equal since the secondary pressure of the valve is the pressure for which pressure loss that the individual first and second reheaters 720 and 820 have is added to the pressure of the reheat steam header 911. Since the primary pressure and the secondary pressure are equal and the valve opening degree is the 100% opening degree of full open in both, the equal discharge steam amount flows into the first and second reheaters 720 and 820 of the individual units.

When this unbalanced output operation is examined from a viewpoint of reheater cooling, for the second unit 800, since the output of the second gas turbine 810 is reduced to 40% and heat source energy of the exhaust gas is lowered, the discharge steam flow rate "q" of ¾F (t/h) is sufficient for cooling the second reheater 820.

However, though the first gas turbine 710 of the first unit 700 keeps the rated 100% output, the flow rate of the first discharge steam "p" is reduced by 25% from F (t/h) that guarantees a cooling effect and is lowered to ¾F (t/h). Therefore, cooling of the first reheater 720 becomes insufficient and a problem that a temperature of the first reheater 720 exceeds a highest using temperature of the first reheater 720 arises. When the situation is viewed from the first unit 701, it can be understood that the discharge steam is taken by the second unit 801 so that the discharge steam flow rate of itself is lowered.

In order to solve the problem of cooling insufficiency of the first reheater 720, an amount of the discharge steam equal to that of the main steam is to be secured for each heat recovery steam generator. That is, when the second discharge steam "q" of ¾F (t/h) flowing into the second reheater 820 of the second unit 801 is reduced to ½F (t/h) that is the same as the main steam "k", the flow rate of the first discharge steam "p" of the first unit is increased from ¾F (t/h) to F (t/h). In this way, it is recognized that the problem is solved. Then, in order to achieve this, it is recognized that the opening degree of the CRH isolation valve 822 should be narrowed to an intermediate opening degree.

However, when this is to be carried out by a method that is an extension of a conventional technology, it is assumed that the flow rate of the second discharge steam "q" of the second unit is measured and flow rate control is performed to the CRH isolation valve 822 so that the value becomes ½F (t/h). Generally, in order to control the flow rate, a flow rate adjusting valve whose operation source is air is used and feedback control represented by a PID controller is used for the control circuit.

In contrast, the CRH isolation valve 822 is a motor-operated valve, and a main installation purpose thereof is use in "interruption and insertion of steam" in activation of a subsequent unit or the like to be described later, and the purpose is not the flow rate control. Referring to the operation speed, the CRH isolation valve 822 is, for example, the motor-operated valve of a large size installed in large diameter piping of a diameter being about 500 mm to 700 mm, and the time of about two minutes is needed for the stroke time (the shortest time needed from full close to full open).

When feedback control is performed using the slow-moving motor-operated valve like this, due to large waste time, responsiveness is bad and the valve opening degree and the flow rate always become instable. However, switching a large diameter valve like the CRH isolation valve 822 from the motor-operated valve to an expensive flow rate adjusting valve in order to control the flow rate is out of the question in terms of costs. Along with that, in an air-operated flow rate adjusting valve, a tight shutting property (a function of completely cutting off steam) when being fully closed is low, and a new problem that the steam cannot be completely intercepted also arises.

To summarize the above, it is difficult and unrealistic to control the flow rate using a large motor-operated valve like the CRH isolation valve. In contrast, in the present embodiment, practical control by the motor-operated valve is provided.

Hereinafter, embodiments of the present invention will be described with reference to the drawings.

First Embodiment

FIG. 1 is a diagram illustrating a configuration of a multiaxial type combined cycle power plant 1 of the 2-2-1 manner relating to the first embodiment. As illustrated in FIG. 1, an operation condition of the multiaxial type combined cycle power plant 1 of the 2-2-1 manner relating to the first embodiment is such that, similarly to FIG. 8, the first gas turbine 710 of the first unit keeps the rated 100% output, the first main steam "n" is the flow rate of F (t/h), and the opening degree of the CRH isolation valve 722 is 100% fully open. On the other hand, the output of the second gas turbine 810 of the second unit 800 is lowered to 40% output, and the second main steam "k" is lowered to the flow rate of ½F (t/h).

In the present embodiment, an object is to adjust the CRH isolation valve 822 so that the flow rate of the second discharge steam "q" becomes ½F (t/h) and increase the first discharge steam "p" of the first unit to F (t/h). For that, instead of measuring the flow rate of the second discharge steam "q" referred to in the above-described comparative example and controlling the flow rate of the motor-operated valve so as to turn it to ½F (t/h), a control apparatus 300 relating to the present embodiment executes the following processing. The control apparatus 300 relating to the present embodiment obtains a flow rate ratio (for example, 1:0.5) of the first main steam "n" and the second main steam "k", and adjusts the CRH isolation valve 822 so as to proportionately divide the flow rate ratio of the discharge steam between the first unit 701 and the second unit 801 to be the same ratio (for example, 1:0.5) as the obtained flow rate. As a result of the adjustment, as illustrated in FIG. 1, when the high pressure isolation valves 704 and 804 and the CRH isolation valve 722 are fully open at the 100% opening degree, the opening degree of the CRH isolation valve 822 becomes 30% for example.

In the adjusting method, the plant control apparatus 300 determines a valve opening degree of the CRH isolation valve 822 using the flow rate ratio of the first main steam "n" and the second main steam "k" and correspondence between the valve opening degree and the flow coefficient (Cv value) of the CRH isolation valve 822, so as to easily handle an element parameter that is the flow rate ratio of the steam.

Next, the configuration of the multiaxial type combined cycle power plant 1 relating to the first embodiment will be described. The configuration of the multiaxial type combined cycle power plant 1 relating to the first embodiment illustrated in FIG. 1 is the configuration for which a measuring instrument 718 is added to the first unit 700, a measuring instrument 818 is added to the second unit 800, an opening degree meter 815 is added to the second unit 801, and the plant control apparatus 300 is added, compared to the multiaxial type combined cycle power plant relating to the comparative example illustrated in FIG. 7.

The measuring instrument 718 measures the flow rate of the first main steam "n". Also, the measuring instrument 818 measures the flow rate of the second main steam "k". The opening degree meter 815 measures the valve opening degree of the CRH isolation valve (second valve) 822. The description will be given hereinafter, assuming that the CRH isolation valve (second valve) 822 in the present embodiment is a motor-operated valve as one example.

The control apparatus 300 includes a valve controller 600. The valve controller 600 includes a processor not shown in the figure and a storage unit not shown in the figure, in which a program is stored, and the processor executes the program stored in the storage unit. Accordingly, the valve controller 600 controls the high pressure isolation valves 704 and 804 and the CRH isolation valves 722 and 822 for example. In FIG. 1, only elements that control the CRH isolation valve 822 among them are illustrated. Here, the valve controller 600 functions as a determination module 601 and a controller 602.

The determination module 601 determines a target opening degree of the CRH isolation valve (second valve) 822 using the flow rate of the first main steam "n" and the flow rate of the second main steam "k".

The controller 602 compares the determined target opening degree with the valve opening degree of the CRH isolation valve (second valve) 822, and controls the CRH isolation valve (second valve) 822 based on a comparison result.

Here, the determination module 601 includes a divider 610, a moving time average operator 612, and a function generator 614. Also, the controller 602 includes a comparator 615 and a comparator 616. To the determination module 601 of the valve controller 600, a flow rate signal "e" indicating the flow rate of the main steam "n", that is obtained by being measured by the measuring instrument 718, and a flow rate signal "m" indicating the flow rate of the main steam "k", that is obtained by being measured by the measuring instrument 818, are inputted.

The divider 610 determines a flow rate ratio "i" ($=m \div e$) by dividing the flow rate signal "m" by the flow rate signal "e", and outputs the flow rate ratio "i" to the moving time average operator 612.

The moving time average operator 612 calculates a moving time average of the flow rate ratio "i" in recent stipulated time (for example, one minute) as a main steam average flow rate ratio "h", and outputs the calculated main steam average flow rate ratio "h" to the function generator 614.

Figure 2:
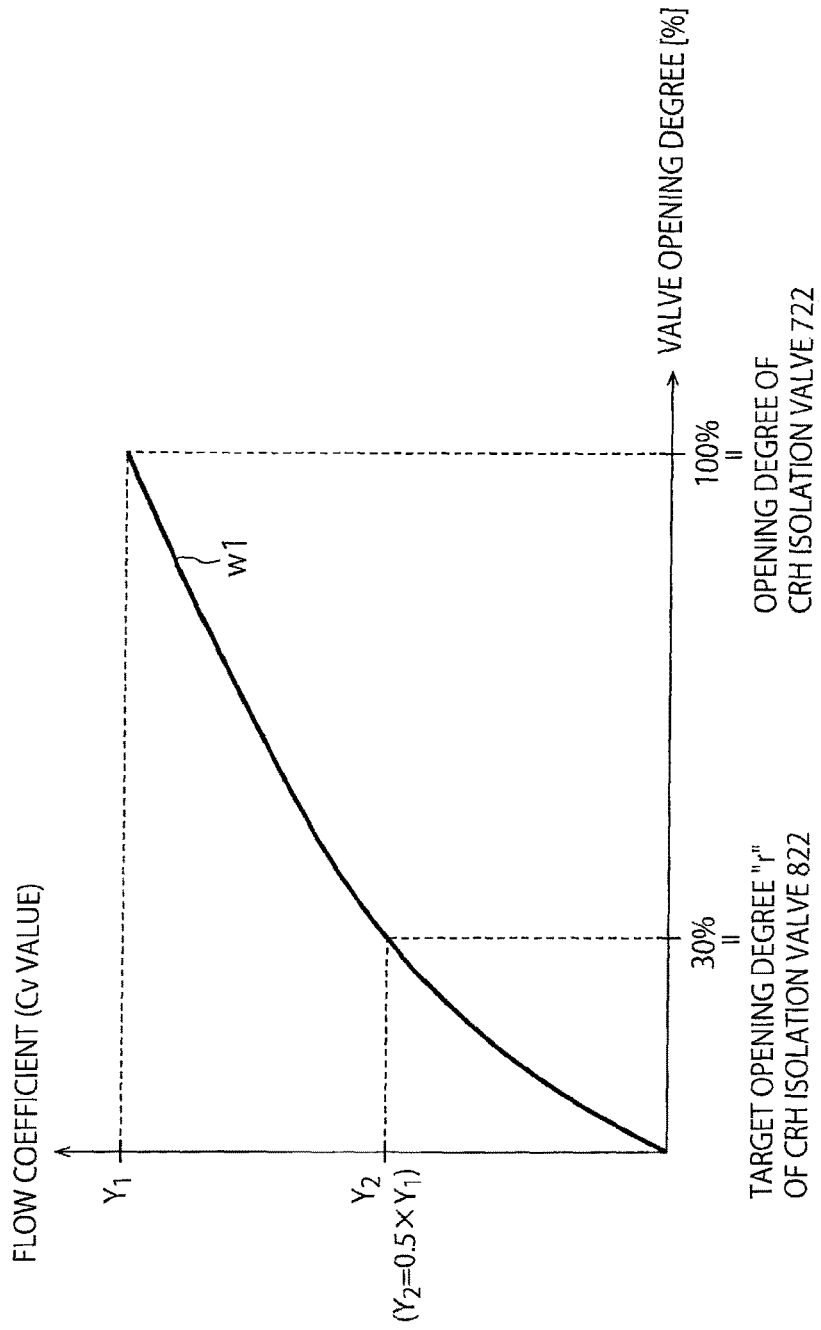
FIG. 2 is a graph illustrating one example of a characteristic of a valve opening degree and a flow coefficient of a CRH isolation valve 822 relating to the first embodiment.

FIG. 2 is a graph illustrating one example of a characteristic of the valve opening degree and the flow coefficient of the CRH isolation valve 822 relating to the first embodiment. In FIG. 2, a vertical axis is the flow coefficient (Cv value), and a horizontal axis is the valve opening degree. Here, the flow coefficient (Cv value) is the flow rate of the CRH isolation valve 822 obtained from the main steam average flow rate ratio "h".

Returning to FIG. 1, the function generator 614 stores the correspondence between the valve opening degree and the flow coefficient (Cv value) of the CRH isolation valve 822, indicating the characteristic as in FIG. 2. The function generator 614 determines a target flow coefficient Y2 of the CRH isolation valve (second valve) 822 from the main steam average flow rate ratio "h", and determines the valve opening degree (for example, 30% in the example in FIG. 2) of the CRH isolation valve (second valve) corresponding to the target flow coefficient Y2 of the CRH isolation valve (second valve) 822 in the correspondence (see FIG. 2) between the valve opening degree and the flow coefficient (Cv value), as a target opening degree "r" of the CRH isolation valve (second valve) 822.

In this way, the determination module 601 calculates the moving time average of the flow rate ratio of the first main steam and the second main steam as the main steam average flow rate ratio "h", and determines the target opening degree of the CRH isolation valve (second valve) 822 using the calculated main steam average flow rate ratio "h" and the correspondence between the valve opening degree and the flow coefficient of the CRH isolation valve (second valve) 822. At the time, the determination module 601 determines the target flow coefficient of the CRH isolation valve (second valve) 822 using the main steam average flow rate ratio "h", and determines the valve opening degree of the CRH isolation valve (second valve) 822 corresponding to the target flow coefficient of the CRH isolation valve (second valve) 822 in the correspondence between the valve opening degree and the flow coefficient, as the target opening degree "r" of the CRH isolation valve (second valve) 822.

Here, since the CRH isolation valve 722 and CRH isolation valve 822 are the valves of the same standard as one example, the correspondence between the valve opening degree and the flow coefficient (Cv value) is also the same.

The function generator 614 outputs the determined target opening degree "r" to the comparator 615 and the comparator 616.

Here, to the controller 602 of the valve controller 600, an opening degree signal "d" indicating the opening degree of the CRH isolation valve 822, which is measured by the opening degree meter 815, is inputted.

The comparator 615 compares the target opening degree "r" with the opening degree signal "d", and in the case that the target opening degree "r" is larger than the opening degree signal "d" (that is, in the case of r>d), outputs a valve opening command "v" to the CRH isolation valve 822.

Similarly, the comparator 616 compares the target opening degree "r" with the opening degree signal "d", and in the case that the target opening degree "r" is smaller than the opening degree signal "d" (that is, in the case of r<d), outputs a valve closing command "w" to the CRH isolation valve 822. In this way, the controller 602 outputs the valve opening command "v" when the opening degree is insufficient, and the valve closing command "w" when the opening degree is excessive according to the target opening degree "r". Accordingly, the opening degree of the CRH isolation valve 822 finally becomes the target opening degree "r".

Thereafter, when the gas turbine output fluctuates and the flow rate signal "e" and the flow rate signal "m" fluctuate, a new main steam average flow rate ratio "h" based on the flow rate signal "e" and the flow rate signal "m" at the time is generated, a new target opening degree "r" is generated, and the opening degree of the CRH isolation valve 822 is corrected.

Next, an operation of the multiaxial type combined cycle power plant 1 relating to the first embodiment having the above configuration will be described.

The first gas turbine 710 of the first unit 700 keeps the rated 100% output, the CRH isolation valve 722 is fully open, and the main steam "n" flows at the flow rate of F (t/h). On the other hand, the second gas turbine 810 of the second unit 800 is lowered to the 40% output, and the main steam "k" flows at the flow rate of ½F (t/h). The operation and effect in FIG. 1 in this state will be described.

Since a value of the flow rate signal "e" is F (t/h) and a value of the flow rate signal "m" is ½F (t/h), the divider 610 divides the flow rate signal "m" by the flow rate signal "e", and outputs the main steam flow rate ratio "i" whose value indicates 0.5. Here, generally the steam flow rate in an actual plant receives various disturbance elements, noise components are impressed, and the flow rate signals "e" and "m" fluctuate in a range of about ±5% at all times. Accordingly, the main steam flow rate ratio "i" also has the fluctuation of about ±10% with 0.5 roughly at the center.

As a countermeasure against it, the determination module 601 relating to the present embodiment includes the moving time average operator 612, and the moving time average operator 612 calculates the moving time average in the recent stipulated time (for example, one minute). Accordingly, the ± fluctuation due to disturbance is absorbed, and the stable main steam average flow rate ratio "h" (=0.5) of the second unit 800 for the first unit 700 is calculated. According to the flow rate ratio 1:0.5 of the main steam, the determination module 601 determines the target opening degree "r" of the CRH isolation valve 822 so that the flow rate ratio of the discharge steam of the second unit 801 to the discharge steam of the first unit 701 also becomes 1:0.5. Then, the controller 602 controls the CRH isolation valve 822 so as to be the determined target opening degree "r". Therefore, the flow rate ratio of the discharge steam of the second unit 801 to the discharge steam of the first unit 701 becomes 1:0.5.

For a purpose of performing the division, the function generator 614 stores the correspondence between the valve opening degree and the flow coefficient (Cv value) of the CRH isolation valve 822 in the inside. For example, when the main steam average flow rate ratio "h" whose value indicates 0.5 is inputted, the function generator 614 acquires a flow coefficient Y1 for the time when the valve opening degree is 100%, since the valve opening degree of the CRH isolation valve 722 is 100%, based on the correspondence between the valve opening degree and the flow coefficient of the CRH isolation valve 822 held inside. Since the main steam average flow rate ratio "h" is 0.5, the function generator 614 obtains the valve opening degree of the valve to be the flow coefficient Y2 which is 0.5 times the flow coefficient Y1 based on the correspondence between the valve opening degree and the flow coefficient of the CRH isolation valve 822. Therefore, 30% can be obtained as the target opening degree "r".

In this way, when the valve controller 600 turns the opening degree of the CRH isolation valve 822 to 30%, the second discharge steam "q" of the second unit 801 becomes ½F (t/h), and as a result, the first discharge steam "p" of the first unit 701 becomes F (t/h). The reason is organized as follows.

(1) The CRH isolation valve 722 of the first unit 701 is 100% fully open, and the flow coefficient (Cv value) is Y1.

(2) The CRH isolation valve 822 of the second unit 801 is at the 30% opening degree, and the flow coefficient (Cv value) Y2 is 0.5 times the Y1.

(3) As described above, since a valve differential pressure "ΔP" of both valves of the CRH isolation valves 722 and 822 and specific gravity "G" of a fluid are roughly equal, there is a relation of the steam flow rate $F=Cv \times \sqrt{(\Delta P/G)}$, so that the ratio of the flow coefficient (Cv value) is the ratio of the steam flow rate F that passes through both valves.

(4) Accordingly, the flow rate of the first discharge steam "p" of the first unit 701 and the second discharge steam "q" of the second unit 801 is divided into the ratio of 1:0.5.

(5) Since the total flow rate of the discharge steam flowing into the discharge steam header 910 is equal to the total value of the main steam flow rate and the total flow rate is 3/2F (t/h), when it is divided into 1:0.5 between the first unit 701 and the second unit 801, the first discharge steam "p" of the first unit 701 is F (t/h), and the second discharge steam "q" of the second unit 801 is ½F (t/h).

In this way, F (t/h) is secured as the flow rate of the first discharge steam "p" of the first unit 701 as intended, and the problem of cooling insufficiency of the first reheater 720 is dissolved.

The present embodiment can demonstrate such an effect while using the motor-operated value by adopting not flow rate control intended to directly turn an actual flow rate of the second discharge steam "q" to desired ½F (t/h), but control that the flow rate ratio of the first discharge steam "p" and the second discharge steam "q" is divided into 1:0.5 and the second discharge steam "q" "indirectly" becomes ½F (t/h) as a result.

As above, in the first embodiment, the multiaxial type combined cycle power plant 1 includes the first superheater 717 that recovers the heat of the exhaust gas of the first gas turbine 710 and generates the first main steam, and the second superheater 817 that recovers the heat of the exhaust gas of the second gas turbine 810 and generates the second main steam. Further, the multiaxial type combined cycle power plant 1 includes the first steam turbine 902 that the first main steam and the second main steam flow into, the first reheater 720 that heats the first discharge steam for which the discharge steam of the first steam turbine 902 is divided and generates the first reheat steam, and the second reheater 820 that heats the second discharge steam for which the discharge steam of the first steam turbine 902 is divided and generates the second reheat steam. Further, the multiaxial type combined cycle power plant 1 includes the second steam turbine 903 that the first reheat steam and the second reheat steam flow into after being merged, the CRH isolation valve (first valve) 722 that adjusts the flow rate of the first discharge steam flowing into the first reheater, and the CRH isolation valve (second valve) 822 that adjusts the flow rate of the second discharge steam flowing into the second reheater 820.

The plant control apparatus 300 that controls the multiaxial type combined cycle power plant 1 having such a configuration includes the determination module 601 that determines the target opening degree "r" of the CRH isolation valve (second valve) 822, using the flow rate of the first main steam and the flow rate of the second main steam. Further, the plant control apparatus 300 includes the controller 602 that compares the determined target opening degree with the valve opening degree of the CRH isolation valve (second valve) 822, and controls the CRH isolation valve (second valve) 822 based on the comparison result.

Since the multiaxial type combined cycle power plant 1 has such a configuration, the valve differential pressure of the first valve and the second valve becomes equal, so that the ratio of the steam flow rates passing through both valves is the ratio of the flow coefficients of both valves. The determination module 601 determines the target opening degree "r" of the CRH isolation valve (second valve) 822 so that the ratio of the steam flow rates passing through both valves becomes the same as the flow rate ratio of the first main steam and the second main steam. Then, the controller 602 controls the CRH isolation valve (second valve) 822 so that the valve opening degree of the CRH isolation valve (second valve) 822 becomes the target opening degree. Accordingly, the ratio of the steam flow rates passing through the CRH isolation valve 722 and the CRH isolation valve 822 becomes the flow rate ratio of the first main steam and the second main steam. As a result, since a sufficient amount of the discharge steam passing through the first reheater 720 of the first unit 701 on the output side of the gas turbine that is larger between the two gas turbines can be secured, the possibility that the first reheater 720 is insufficiently cooled can be reduced.

First Modification of First Embodiment

In the first embodiment, an application example of a control manner to the multiaxial type combined cycle power plant of the 2-2-1 manner is described, however, the control manner relating to the first embodiment is applicable also to a multiaxial type combined cycle power plant of a 3-3-1 manner of combining three gas turbines, three heat recovery steam generators, and one steam turbine.

For example, a case of being in an operation state that the gas turbine of the first unit is 100% loaded, the gas turbine of the second unit is 40% loaded, and the gas turbine of the third unit is 20% loaded is assumed. In this case, the plant control apparatus 300 adjusts the CRH isolation valve of the second unit according to the main steam flow rate ratio of the first unit and the second unit, and similarly adjusts the CRH isolation valve of the third unit according to the main steam flow rate ratio of the first unit and the third unit.

Accordingly, the flow rate of the discharge steam can be divided among the first unit, the second unit and the third unit according to the flow rate ratio of the main steam among the first unit, the second unit and the third unit. Similarly, the control manner relating to the first embodiment is applicable also to a multiaxial type combined cycle power plant of an N-N-1 manner of combining N (N is a natural number) gas turbines, N heat recovery steam generators, and one steam turbine.

Second Modification of First Embodiment

Figure 3:
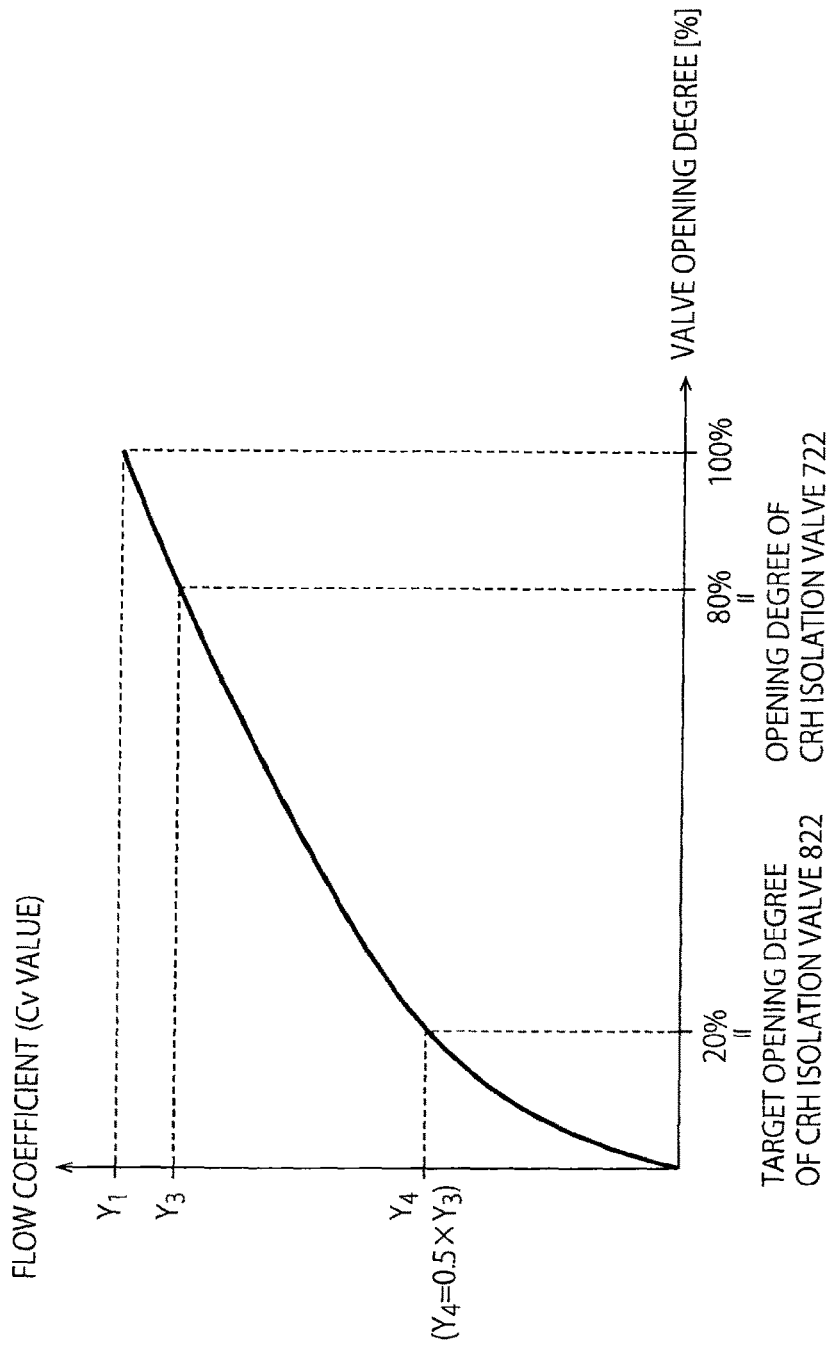
FIG. 3 is a graph illustrating one example of the characteristic of the valve opening degree and the flow coefficient of the CRH isolation valve 822 relating to a second modification of the first embodiment.

Next, using FIG. 3, the second modification of the first embodiment will be described. FIG. 3 is a graph illustrating one example of the characteristic of the valve opening degree and the flow coefficient of the CRH isolation valve 822 relating to the second modification of the first embodiment. In FIG. 3, a vertical axis is the flow coefficient (Cv value), and a horizontal axis is the valve opening degree.

In a normal operation, the CRH isolation valve of a unit (here, the first unit 701) on the side where the output of the gas turbine is large is at 100%. The reason is that, when use is performed when the opening degree of the CRH isolation valve is full open or less, pressure loss becomes large, the temperature and pressure of the discharge steam are lowered, and the output of the low pressure steam turbine 903 is lowered for that, leading to economical loss as a commercial machine. However, though it is rare, there is also a case that the CRH isolation valve of the unit on the large output side is operated at an intermediate opening degree.

In the present modification, the case that the CRH isolation valve of the unit on the large output side is operated at the intermediate opening degree is assumed. The multiaxial type combined cycle power plant 1 in the second modification of the first embodiment includes an opening degree meter (not shown in the figure) that measures the opening degree of the CRH isolation valve 722 further for the multiaxial type combined cycle power plant 1 in FIG. 1. The opening degree meter outputs an opening degree signal indicating the opening degree of the CRH isolation valve 722 to the determination module 601.

In the case that the unit on the large output side is defined as the first unit and the CRH isolation valve 722 of the first unit (the large output side) is at the 80% opening degree, the function generator 614 built into the determination module 601 of the present modification obtains the target opening degree "r" of the CRH isolation valve 822 of the second unit (the small output side) by a following procedure.

(1) The function generator 614 stores the correspondence between the valve opening degree and the flow coefficient (Cv value) of the CRH isolation valve 822, having the characteristic as illustrated in FIG. 3.

(2) The function generator 614 acquires the opening degree signal indicating the opening degree of the CRH isolation valve 722. Since the opening degree of the CRH isolation valve 722 is 80%, a flow coefficient Y3 for the time when the opening degree is 80% is read from the correspondence between the valve opening degree and the flow coefficient (Cv value) of the CRH isolation valve 822.

(3) The function generator 614 multiplies Y3 by 0.5 according to the main steam average flow rate ratio "h"

(similarly defined as 0.5) that is the flow rate ratio of the main steam of the second unit to the first unit, and obtains a target flow coefficient Y4 of the CRH isolation valve (second valve) 822.

(4) The function generator 614 reads the valve opening degree for the time when the flow coefficient is Y4 from the correspondence between the valve opening degree and the flow coefficient (Cv value) of the CRH isolation valve 822. Since the read valve opening degree is 20%, the function generator 614 outputs the target opening degree "r" whose value indicates 20%.

In this way, between the CRH isolation valve (first valve) 722 and the CRH isolation valve (second valve) 822, the correspondence between the valve opening degree and the flow coefficient (Cv value) is substantially the same. Then, the determination module 601 obtains the flow coefficient corresponding to the valve opening degree of the first valve in the correspondence between the valve opening degree and the flow coefficient (Cv value) of the CRH isolation valves 722 and 822, and determines the target flow coefficient Y4 of the CRH isolation valve (second valve) 822 using the obtained flow coefficient and the main steam average flow rate ratio "h".

Then, the determination module 601 determines the valve opening degree of the CRH isolation valve (second valve) 822 corresponding to the target flow coefficient Y4 of the CRH isolation valve (second valve) 822 in the correspondence between the valve opening degree and the flow coefficient (Cv value) of the CRH isolation valves 722 and 822, as the target opening degree "r" of the CRH isolation valve (second valve) 822.

When configured such that the determination module 601 is operated in this way, even when the CRH isolation valve 722 on the large output side is at an intermediate opening degree, the ratio of the steam flow rates passing through the CRH isolation valve 722 and the CRH isolation valve 822 becomes the flow rate ratio of the first main steam and the second main steam. As a result, since the sufficient amount of the discharge steam passing through the first reheater 720 of the first unit 701 on the output side of the gas turbine that is larger between the two gas turbines can be secured, the possibility that the first reheater 720 is insufficiently cooled can be reduced.

Second Embodiment

Next, the second embodiment will be described. In the multiaxial type combined cycle power plant relating to the first embodiment, the CRH isolation valve (first valve) 722 is provided before the first reheater 720 to adjust the flow rate of first exhaust steam flowing into the first reheater, and the CRH isolation valve (second valve) 822 is provided before the second reheater 820 to adjust the flow rate of second exhaust steam flowing into the second reheater 820. In contrast, in the multiaxial type combined cycle power plant relating to the second embodiment, a CRH isolation valve (first valve) 732 is provided after the first reheater 720 to adjust the flow rate of the first reheat steam discharged from the first reheater 720, and a CRH isolation valve (second valve) 832 is provided after the second reheater 820 to adjust the flow rate of the second reheat steam discharged from the second reheater 820.

Figure 4:
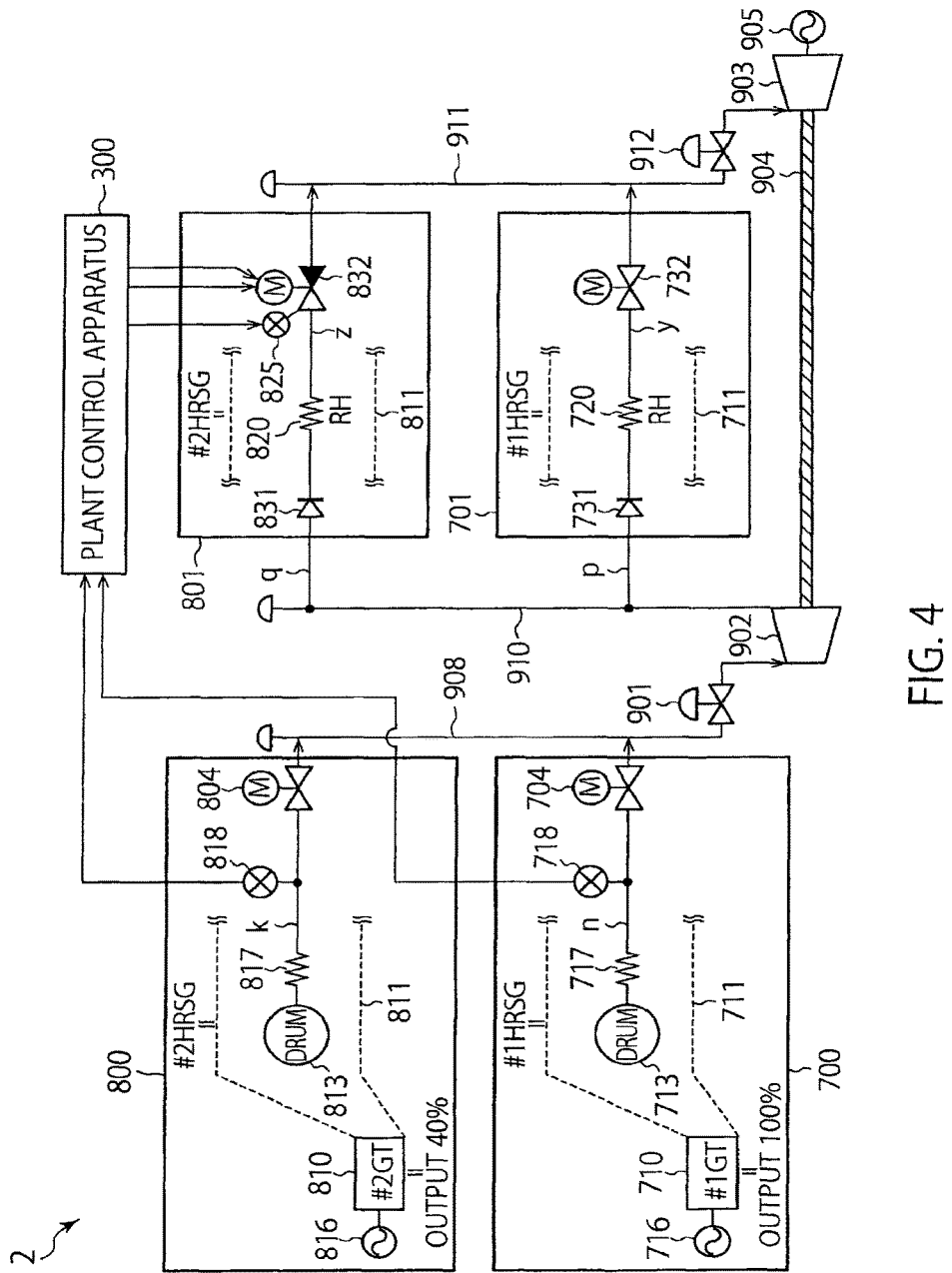
FIG. 4 is a diagram illustrating a configuration of a multiaxial type combined cycle power plant 2 of the 2-2-1 manner relating to a second embodiment.

FIG. 4 is a diagram illustrating a configuration of the multiaxial type combined cycle power plant 2 of the 2-2-1 manner relating to the second embodiment. The same signs are attached to elements in common with FIG. 1, and the specific description will be omitted. As illustrated in FIG. 4, the configuration of the multiaxial type combined cycle power plant 2 of the 2-2-1 manner relating to the second embodiment is different in the following points, compared to the configuration of the multiaxial type combined cycle power plant 1 relating to the first embodiment illustrated in FIG. 1.

Check valves 731 and 831 are provided respectively between the discharge steam header 910 and the first and second reheaters 720 and 820, and HRH (Hot ReHeat: high temperature reheat) isolation valves 732 and 832 are provided between the first and second reheaters 720 and 820 and the reheat steam header 911. Accordingly, the HRH isolation valve (first valve) 732 adjusts the flow rate of the first reheat steam discharged from the first reheater 720. Also, the HRH isolation valve (second valve) 832 adjusts the flow rate of the second reheat steam discharged from the second reheater 820. Further, an opening degree meter 825 that measures the opening degree of the HRH isolation valve 832 is provided.

The control apparatus 300 in the first embodiment controls the CRH isolation valve 822 using the opening degree of the CRH isolation valve 822. In contrast, the control apparatus 300 in the second embodiment uses the opening degree of the HRH isolation valve 832 instead of the opening degree of the CRH isolation valve 822. Then, a control target is also changed from the CRH isolation valve 822 to the HRH isolation valve 832.

The control apparatus 300 in the second embodiment obtains the flow rate ratio of the main steam between the first unit 700 and the second unit 800 based on the control manner of the first embodiment, and adjusts the opening degree of the HRH isolation valve 832 so as to divide the flow rate ratio of the reheat steam between the first unit 701 and second unit 801 accordingly. As a result of the adjustment, as illustrated in FIG. 4, when the high pressure isolation valves 704 and 804 and the HRH isolation valve 732 are fully open at the 100% opening degree, the opening degree of the HRH isolation valve 832 becomes 30% for example.

In this way, when the HRH isolation valve 832 is adjusted as described above instead of the CRH isolation valve 822 in the first embodiment, since the amount of the reheat steam passing through the second reheater 820 is equal in both, the problem of the cooling insufficiency of the first reheater 720 due to output unbalance between the first unit 700 and the second unit 800 can be dissolved.

Upon application to an actual multiaxial type combined cycle power plant, there are a choice of adjusting the flow rate of the discharge steam by the CRH isolation valve in the first embodiment and a choice of adjusting the flow rate of the reheat steam by the HRH isolation valve in the second embodiment. Both are equal in the operation and the effect. However, from a viewpoint of tolerance of a valve structure due to narrowing of a passing fluid or the like, a burden on the HRH isolation valve that handles the reheat steam at a higher temperature is large, and it is also disadvantageous in terms of costs when selecting the material. From this, in an implementation plan, the multiaxial type combined cycle power plant 1 in the first embodiment using the CRH isolation valve that handles the discharge steam of a low temperature is preferable.

As a different modification, in the multiaxial type combined cycle power plant of a cascade bypass manner described later, since both valves of the CRH isolation valve and the HRH isolation valve are installed in a system, it is also possible to adjust both of the isolation valves together at the intermediate opening degree. In this case, the valve controller 600 may determine the target opening degree of both isolation valves using the flow rate ratio of the first main steam and the second main steam and the correspondence between the valve opening degree and the flow coefficient (Cv value) of combination when the two motor-operated valves are serially configured, and control both isolation valves so that both isolation valves are turned to the determined target opening degree.

Third Embodiment

Figure 5:
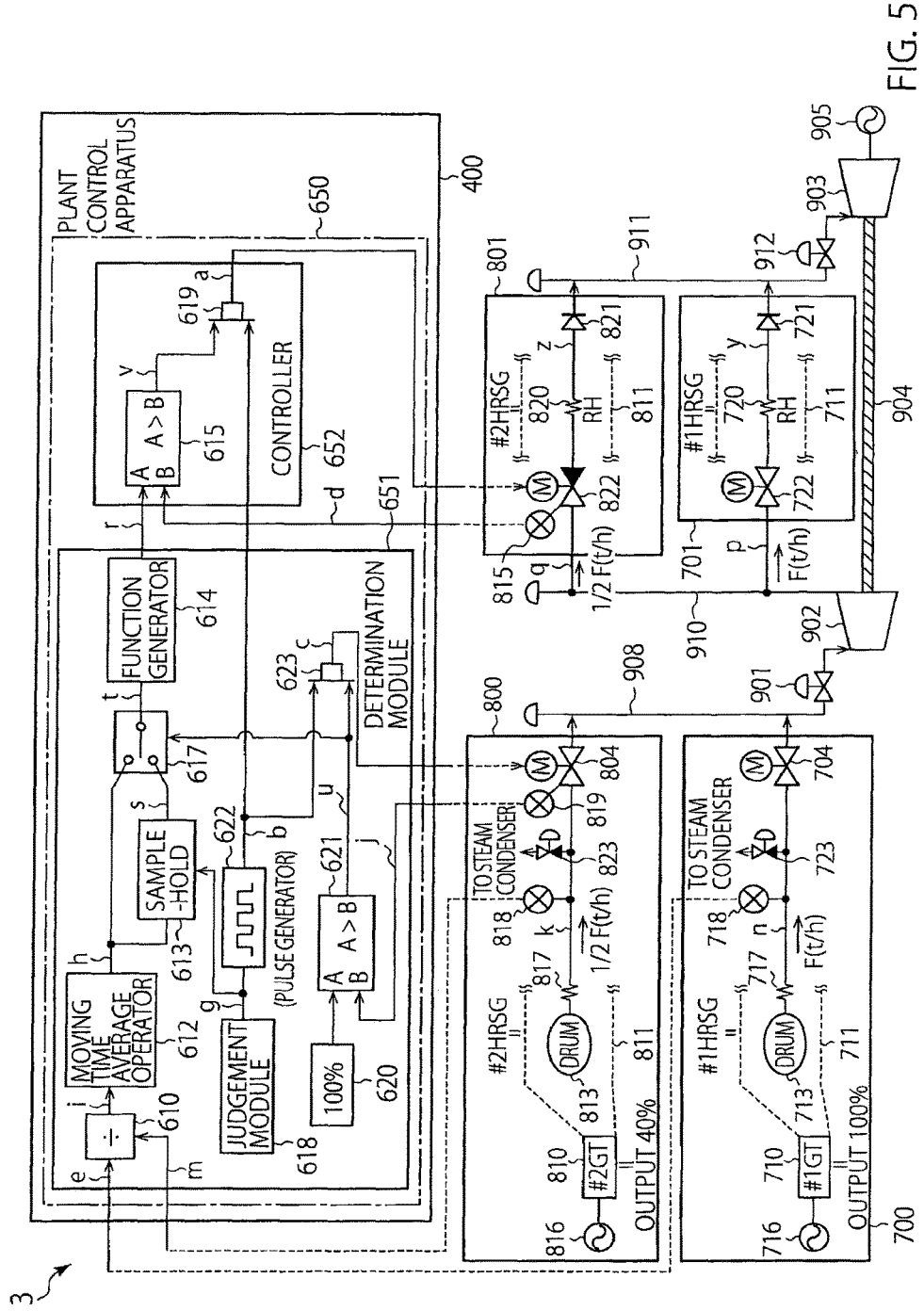
FIG. 5 is a diagram illustrating a configuration of a multiaxial type combined cycle power plant 3 of the 2-2-1 manner relating to a third embodiment.

Next, the third embodiment will be described. FIG. 5 is a diagram illustrating a configuration of the multiaxial type combined cycle power plant 3 of the 2-2-1 manner relating to the third embodiment. The same signs are attached to elements in common with FIG. 1, and the specific description will be omitted. As illustrated in FIG. 5, the configuration of the multiaxial type combined cycle power plant 3 in the third embodiment is the one for which, to the configuration of the multiaxial type combined cycle power plant 1 in the first embodiment, turbine bypass valves 723 and 823 are added, an opening degree meter 819 that measures the valve opening degree of the high pressure isolation valve 804 is added, and the control apparatus 300 is changed to a control apparatus 400. Here, the control apparatus 400 includes a valve controller 650.

(For Late Unit Activation)

Due to a fault of the second unit or the like, an operation condition of responding to power generation demand by performing an operation unavoidably in a plant configuration of only the first units 700 and 701 and the steam turbines 902 and 903, that is, a 1-1-1 manner is sometimes taken. The present embodiment is a case of applying the control manner relating to the first embodiment to a process of additionally activating the gas turbine 810 of the second unit 800 after the second units 800 and 801 are restored and returning to the configuration of the combined cycle power plant of the 2-2-1 manner from the operation condition (this is called the late unit activation).

Describing a background of occurrence of the unbalanced output between the first unit 700 and the second unit 800 even in the late unit activation, the first gas turbine 710 of the first unit 700 is in a rated 100% output operation pursuing economic efficiency as a commercial operation in the operation state of the 1-1-1 manner as it is. On the other hand, the second gas turbine 810 of the second unit 800 is activated after being restored, however, since the CRH isolation valve 822 is initially in a fully closed state at the time, the flow rate of the second discharge steam "q" is zero, that is, a cooling medium passing through the second reheater 820 is zero.

If the second gas turbine 810 is turned to a rated 100% output state in this state, a problem of cooling of the second reheater 820 arises due to the high gas turbine exhaust gas temperature. Then, output of the gas turbine 810 of the second unit 800 is limited to the largest gas turbine output (for example, 40% output, the 40% is a numerical value for the convenience of the description) that the second reheater 820 can withstand when there is no flow rate of the second discharge steam "q". For this reason, in the late unit activation, the unbalanced output operation that the second unit is 40% to the rated 100% of the first unit is forced.

In the case of performing the late unit activation by a conventional technology, the cooling insufficiency of the first reheater 720 of the first unit 701 becomes a problem due to the output unbalance between the gas turbine 710 of the first unit 700 and the gas turbine 810 of the second unit 800. Then, in the conventional technology, in order to avoid it, the late unit activation is performed after deliberately lowering the gas turbine 710 of the first unit 700 operated at the rated 100% output to the 40% output, and matching the output of the gas turbine 710 of the first unit 700 and the gas turbine 810 of the second unit 800. However, it has been a big problem to lower the output of the power plant operated at the rated output in order to respond to tight power demand to a partial load even though it is only temporary.

Then, in the present embodiment, by adjusting the opening degree of the CRH isolation valve 822 according to the flow rate ratio of the main steam in the process of the late unit activation, the late unit activation that reduces the possibility that the first reheater 720 of the first unit is insufficiently cooled becomes possible even in the unbalanced state that the output of the gas turbine 810 of the second unit 800 is 40% while keeping the gas turbine 710 of the first unit 700 at the 100% output. Hereinafter, details of the late unit activation by the third embodiment will be described.

(Plant Operation State of 1-1-1 Manner)

In the plant operation state of the 1-1-1 manner, the first gas turbine 710 of the first unit 700 is operated at the rated 100% output. Then, the high pressure isolation valve 704 and the CRH isolation valve 722 are both 100% fully open, and the flow rate of F (t/h) flows respectively for the main steam "n" and the first discharge steam "p". On the other hand, the second gas turbine 810 of the second unit 800 is stopped. Then, the high pressure isolation valve 804 and the CRH isolation valve 822 are both fully closed to prevent the steam of the first units 700 and 701 from flowing into the second units 800 and 801. At the time, a tight shutting property of the above-described motor-operated valves is required.

From the state, when the gas turbine 810 of the second unit 800 is additionally activated and the process of the late unit activation is started, the second gas turbine 810 is activated first and the output is raised to the 40% output. The main steam "k" generated immediately after the activation is insufficient in the temperature, a pressure and the flow rate, and cannot be supplied to the high pressure steam turbine 902. During the time, the high pressure isolation valve 804 is fully closed, the turbine bypass valve 823 is opened instead through pressure control of appropriately keeping an intra-device pressure of the drum 813, and the main steam "k" is released to a steam condenser (not shown in the figure).

While the second gas turbine 810 is continuously operated while being kept at the 40% output, a temperature raising and pressure raising process of the heat recovery steam generator 811 progresses, the flow rate of the main steam "k" also gradually increases, and the flow rate is also established. For the convenience of the description, the flow rate of the main steam "k" at the 40% output established at the time is defined as ½F (t/h). When the second unit reaches this state, insertion to the high pressure steam turbine 902 of the second main steam "k" generated by the second superheater 817 is started.

(Details of Processing of Valve Controller 650)

For the valve controller 650, compared to the valve controller 600 in the first embodiment, the determination module 601 is changed to a determination module 651, and the controller 602 is changed to a controller 652. For the configuration of the determination module 651 in the third embodiment, compared to the configuration of the determination module 601 in the first embodiment, a sample-hold unit 613a switch 617, a judgement module 618, a setter 620, a comparator 621, a pulse generator 622, and an AND gate 623 are added. For the configuration of the controller 652 in the third embodiment, compared to the configuration of the controller 602 in the first embodiment, an AND gate 619 is added and the comparator 616 is eliminated.

The judgement module 618 considers the temperature or pressure or the like of the second main steam generated by the second superheater 817, judges that it is possible to insert the second main steam, and turns an insertion start signal "g" indicating second unit insertion start to 1. The insertion start signal "g" is inputted to the pulse generator 622, and the pulse generator 622 generates a pulse signal "b" to be a high level only for a second stipulated interval in every first stipulated interval (for example, to be the high level only for one second in every 10 seconds) for example, and outputs the pulse signal "b" to the AND gate 619.

Also, to the determination module 651, an opening degree signal "j" indicating the opening degree of the high pressure isolation valve 804 measured by the opening degree meter 819 is inputted. The comparator 621 compares 100% set to the setter 620 with the opening degree signal "j", and outputs an opening degree increase command "u" (=1) commanding opening degree increase to the high pressure isolation valve 804 to the AND gate 623 when it is 100%>j.

The AND gate 623 generates a valve opening command "c" commanding valve opening to the high pressure isolation valve 804 by ANDing the opening degree increase command "u" and the pulse signal "b", and outputs the generated valve opening command "c" to the high pressure isolation valve 804.

By such a configuration, the high pressure isolation valve 804 is gradually opened, and the high pressure isolation valve 804 finally becomes 100% fully open from being fully closed. When the high pressure isolation valve 804 is 100% fully open, the opening degree increase command "u" becomes 0 and the valve opening command "c" is turned off.

Also, to the determination module 651, the flow rate signal "e" indicating the flow rate of the main steam "n" measured by the measuring instrument 718 and the flow rate signal "m" indicating the flow rate of the main steam "k" measured by the measuring instrument 818 are inputted. The divider 610 acquires the main steam flow rate ratio "i" (=m÷e) by dividing the flow rate signal "m" by the flow rate signal "e". The main steam flow rate ratio "i" is outputted from the divider 610 and inputted to the moving time average operator 612.

The moving time average operator 612 calculates the moving time average of the main steam flow rate ratio "i" in the recent predetermined time (for example, one minute) as the main steam average flow rate ratio "h". The main steam average flow rate ratio "h" is outputted from the moving time average operator 612 and inputted to the sample-hold unit 613 and the switch 617.

The sample-hold unit 613 stores the main steam average flow rate ratio "h" at a moment when the insertion start signal "g" becomes 1, and outputs this value as an insertion start time main steam flow rate ratio "s". Therefore, after this processing, the insertion start time main steam flow rate ratio "s" becomes a fixed value.

The switch 617 switches a corrected main steam flow rate ratio "t" which is an output value thereof between the insertion start time main steam flow rate ratio "s" and the main steam average flow rate ratio "h" according to the value of the opening degree increase command "u". Specifically, the switch 617 outputs the insertion start time main steam flow rate ratio "s" as the corrected main steam flow rate ratio "t" when the opening degree increase command "u" is 1, and outputs the main steam average flow rate ratio "h" as the corrected main steam flow rate ratio "t" when the opening degree increase command "u" is 0.

Therefore, after the high pressure isolation valve 804 starts to open until immediately before becoming 100%, the insertion start time main steam flow rate ratio "s" is outputted as the corrected main steam flow rate ratio "t", and in the case that the high pressure isolation valve 804 becomes 100%, the main steam average flow rate ratio "h" is outputted as the corrected main steam flow rate ratio "t". Then, the outputted corrected main steam flow rate ratio "t" is inputted to the function generator 614.

In the function generator 614, the correspondence between the valve opening degree and the flow coefficient (Cv value) of the CRH isolation valve 822 which is the same as that in FIG. 1 is stored. Similarly to the function generator 614 in the first embodiment, the function generator 614 determines the target opening degree "r" of the CRH isolation valve 822 using the corrected main steam flow rate ratio "t" and the correspondence between the valve opening degree and the flow coefficient (Cv value) of the CRH isolation valve 822. The determined target opening degree "r" is outputted from the function generator 614 and inputted to the comparator 615.

Also, to the controller 652, the opening degree signal "d" indicating the opening degree of the CRH isolation valve 822 measured by the opening degree meter 815 is inputted. The comparator 615 compares the inputted target opening degree "r" with the inputted opening degree signal "d", and when the target opening degree "r" is larger than the opening degree signal "d" (that is, when it is r>d), outputs an opening degree increase command "v" to the CRH isolation valve 822.

The AND gate 619 generates a valve opening command "a" to the CRH isolation valve 822 by ANDing the opening degree increase command "v" and the pulse signal "b". Then, the generated valve opening command "a" is outputted to the CRH isolation valve 822. By such a configuration, the CRH isolation valve 822 is finally opened at the target opening degree "r" from being fully closed.

In the present embodiment, since it is the operation in which the CRH isolation valve 822 is surely opened from the fully closed state, the valve closing command "w" is not required. Therefore, the controller 652 in the present embodiment does not include the comparator 616 included in the first embodiment.

(Operation and Effect of Valve Controller 650)

After it becomes possible to insert the second main steam to the high pressure steam turbine 902, the high pressure isolation valve 804 is opened by the valve opening command "c", the main steam "k" is sent to the high pressure steam header 908, and the main steam "k" is inserted through the regulating valve 901 to the high pressure steam turbine 902. At the time, the valve controller 650 can send the main steam "k" to the high pressure steam header 908 more effectively by forcibly closing the turbine bypass valve 823 by control not shown in the figure.

However, quickly performing a fully opening operation of the high pressure isolation valve 804 in a short time greatly affects a plant pressure system. For example, when a large amount of the main steam "k" is made to rapidly flow into the high pressure steam header 908 by quick valve opening, the intra-device pressure of the drum 813 of the second unit 800 is greatly lowered. As a result, a swelling phenomenon that a water level of the drum 813 rises is shown.

Also, when a large amount of the main steam "k" is sent to the high pressure steam header 908 also on the side of the first unit 700, a condition is such that inflow of the main steam "n" of the first unit is blocked (cut off), and the intra-device pressure of the drum 713 rises. As a result, a shrinking phenomenon of inversely inviting water level decline of the drum 713 is shown.

In both swelling phenomenon and shrinking phenomenon, need occurs to urgently stop the gas turbine in order to protect a device in the worst case. In order to mitigate influence accompanying the valve opening like this, the pulse generator 622 is conventionally provided, and the valve opening command "c" to the high pressure isolation valve 804 is outputted in a pulse shape of one second in 10 seconds. That is, the high pressure isolation valve 804 is fully opened while repeating a motor pause of nine seconds after the valve is opened by motor drive for one second. This is called an inching valve opening manner. In this way, the high pressure isolation valve 804 is opened at a slow speed of about 1/10 compared to a normal case of continuously driving a motor.

However, even if it is not extreme pressure fluctuation of reaching gas turbine emergency stop, the insertion of the steam is a dynamic process of switching the main steam "k" passing through a route of the turbine bypass valve 823 until then to a route to the high pressure steam header 908. Even if the above-described inching valve opening manner is adopted, the pressure fluctuation is brought more or less to both of the main steam "k" and the main steam "n", and the flow rates thereof also largely fluctuate. As a result, it becomes difficult to correctly obtain the flow rate ratio of the first main steam "n" and the second main steam "k".

Then, in the present embodiment, attention is paid to the fact that, in the insertion of the steam, while the valve is fully opened from being closed while keeping the output of the second gas turbine 810 at 40%, the output of the second gas turbine 810 is not increased or decreased and the flow rate of the main steam "k" is fixed from full close to full open.

Specifically, the sample-hold unit 613 stores the main steam average flow rate ratio "h" at the moment when the insertion start signal "g" becomes 1, and outputs it as the insertion start time main steam flow rate ratio "5". Here, the main steam average flow rate ratio "h" at the moment when the insertion start signal "g" becomes 1 is the main steam average flow rate ratio "h" in a stable state immediately before the high pressure isolation valve 804 is opened. The insertion start time main steam flow rate ratio "s" in this case is 0.5 similarly to FIG. 1 as one example, and since the opening degree increase command "u" is 1, the switch 617 outputs the insertion start time main steam flow rate ratio "s" whose value indicates 0.5 as the corrected main steam flow rate ratio "t".

A period during which the opening degree increase command "u" is 1 is the period until the high pressure isolation valve 804 is fully opened from being fully closed while repeating motor drive valve opening of one second and the motor pause of nine seconds. In the period during which the opening degree increase command "u" is 1, the flow rate ratio of the main steam "n" and the main steam "k" largely fluctuates. However, when configured in this way, since the sample-hold unit 613 stores the insertion start time main steam flow rate ratio "s" whose value is 0.5, even when the actual flow rates of the main steam "n" and the main steam "k" fluctuate, the corrected main steam flow rate ratio "t" is fixed at 0.5.

When the corrected main steam flow rate ratio "t" whose value indicates 0.5 is inputted, the function generator 614 obtains the valve opening degree of the valve to be the flow coefficient Y2 that is 0.5 times the flow coefficient Y1 for the time when the valve is 100% fully open, based on the correspondence between the valve opening degree and the flow coefficient indicating the characteristic in FIG. 2 held inside similarly to FIG. 1, as the target opening degree (for example, 30%) "r".

Then, the CRH isolation valve 822 is opened while repeating the motor pause of nine seconds after the valve is opened by motor drive for one second by the operation of the pulse generator 622 similarly to the high pressure isolation valve 804, and is finally turned to the 30% opening degree. Here, the quick opening of the CRH isolation valve 822 causes the rapid insertion of the second discharge steam "q" to the low pressure steam turbine 903, turbine thrust force suddenly changes, and adverse influence is given, so that the CRH isolation valve 822 is also subjected to inching valve opening similarly to the high pressure isolation valve 804.

By the opening of the CRH isolation valve 822, the second discharge steam "q" is overheated while flowing into the second reheater 820, becomes the second reheat steam "z", sent to the reheat steam header 911, and inserted to the low pressure steam turbine 903.

When the high pressure isolation valve 804 is fully open at which it can be considered that the process of inserting the second main steam to the high pressure steam turbine 902 is ended, the CRH isolation valve 822 is open at 30%. When the process of inserting the steam is ended in this way, as illustrated in FIG. 5, a state is such that the high pressure isolation valves 704 and 804 and the CRH isolation valve 722 are fully open at the 100% opening degree, and the opening degree of the CRH isolation valve 822 becomes 30% for example. At the time, while the second discharge steam "q" of the second unit 801 is ½F (t/h), the first discharge steam "p" of the first unit 701 is F (t/h). Therefore, since the sufficient amount of the discharge steam passing through the first reheater 720 can be secured, the possibility that the first reheater 720 is insufficiently cooled can be reduced.

When the high pressure isolation valve 804 becomes fully open, the pressure fluctuation of the main steam "k" and the main steam "n" also calms down, and excessive flow rate fluctuation also ends. At the time, the opening degree increase command "u" becomes 0, and the switch 617 selects and outputs the main steam average flow rate ratio "h" as the corrected main steam flow rate ratio "t". Thereafter, in the process of raising the output of the second gas turbine 810 to the rated 100%, when the second main steam "k" increases, the main steam average flow rate ratio "h" corresponding to that is calculated, and the opening degree of the CRH isolation valve 822 increases.

As above, in the third embodiment, the multiaxial type combined cycle power plant 3 includes a third valve 804 that is provided between the second superheater 817 and the first steam turbine 902 and adjusts the flow rate of the second main steam. In the case of opening the third valve 804 and supplying the second main steam to the first steam turbine 902 from the state that only the first main steam flows into the first steam turbine 902, before the third valve 804 is opened to a stipulated rate (for example, 100%), the determination module 651 determines the target opening degree "r" of the second valve 822 using the flow rate ratio of the first main steam and the second main steam and the correspondence between the valve opening degree and the flow coefficient of the second valve 822 when the third valve 804 is opened.

On the other hand, after the third valve 804 is opened to the stipulated rate (for example, 100%), the determination module 651 determines the target opening degree of the second valve 822 using the flow rate ratio of the first main steam and the second main steam and the correspondence between the valve opening degree and the flow coefficient of the second valve 822 at the determination time.

Therefore, while the third valve 804 is opened to the stipulated rate from being closed, the second valve 822 is controlled so as to be at the target opening degree (for example, 30%). Accordingly, the flow rate ratio of the first discharge steam "p" of the first unit 701 and the second discharge steam "q" of the second unit 801 is maintained in the same state as the flow rate ratio of the first main steam and the second main steam. As a result, since the sufficient amount of the discharge steam passing through the first reheater 720 can be secured, the possibility that the first reheater 720 is insufficiently cooled can be reduced.

Also, even after the third valve 804 is opened to the stipulated rate, control is performed to be the target opening degree according to the flow rate ratio of the first main steam and the second main steam at the control time. Accordingly, the flow rate ratio of the first discharge steam "p" of the first unit 701 and the second discharge steam "q" of the second unit 801 is maintained in the same state as the flow rate ratio of the first main steam and the second main steam. As a result, since the sufficient amount of the discharge steam passing through the first reheater 720 can be secured, the possibility that the first reheater 720 is insufficiently cooled can be reduced.

When the second gas turbine 810 becomes rated 100% (or when it is turned to an appropriate output state before that), the control apparatus 400 may include the valve controller 650 and the valve controller 600, the valve controller 650 may be switched to the valve controller 600, and the valve controller 600 may control the CRH isolation valve 822. Here, the valve controller 600 does not include the pulse generator built into the valve controller 650, however, the fluctuation of the main steam flow rate which occurs accompanying increase/decrease of the gas turbine output is much gentler than that during the valve opening operation of the high pressure isolation valve, and there is no problem.

Modification of Third Embodiment

Next, the modification of the third embodiment will be described. The present modification is an application case relating to the late unit activation of the multiaxial type combined cycle power plant of the 2-2-1 manner called the so-called cascade bypass manner. In the third embodiment, the valve controller 650 obtains the flow rate ratio of the first main steam and the second main steam immediately before the high pressure isolation valve 804 is opened as the insertion start time main steam flow rate ratio "s". In contrast, in the present modification, the valve controller 650 obtains and stores the flow rate ratio of the first discharge steam "p" and the second discharge steam "q" immediately before the high pressure isolation valve 804 is opened as a discharge steam flow rate ratio, and adjusts the CRH isolation valve (second valve) 822 so as to divide the flow rate of the discharge steam between the first unit 701 and the second unit 801 according to the stored discharge steam flow rate ratio.

Figure 6:
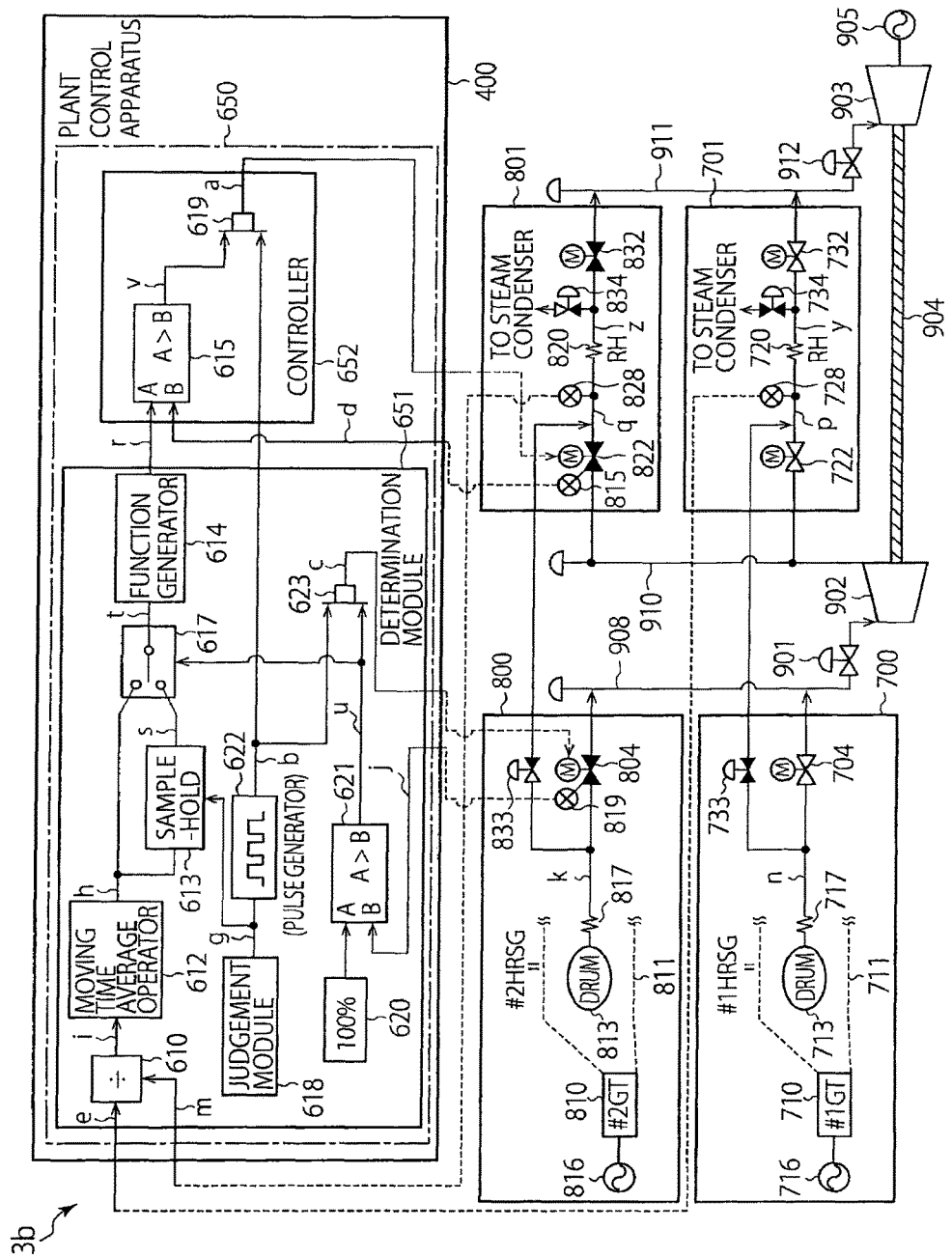
FIG. 6 is a diagram illustrating a configuration of a multiaxial type combined cycle power plant 3b of the 2-2-1 manner relating to a modification of the third embodiment.

FIG. 6 is a diagram illustrating a configuration of a multiaxial type combined cycle power plant 3b of the 2-2-1 manner relating to the modification of the third embodiment. The same signs are attached to elements in common with FIG. 5, and the specific description will be omitted. As illustrated in FIG. 6, the configuration of the multiaxial type combined cycle power plant 3b relating to the present modification is different in the following points, compared to the configuration of the multiaxial type combined cycle power plant 3 relating to the third embodiment illustrated in FIG. 5.

The multiaxial type combined cycle power plant 3b relating to the present modification includes a high pressure turbine bypass valve 833 and a low pressure turbine bypass valve 834 instead of the turbine bypass valve 823, and the HRH isolation valve 832 is added.

Similarly, the multiaxial type combined cycle power plant 3b relating to the present modification includes a high pressure turbine bypass valve 733 and a low pressure turbine bypass valve 734 instead of the turbine bypass valve 723, and the HRH isolation valve 732 is added.

Also, the multiaxial type combined cycle power plant 3b relating to the present modification includes a measuring instrument 728 that measures the flow rate of the first discharge steam "p" and a measuring instrument 828 that measures the flow rate of the second discharge steam "q", instead of the measuring instruments 718 and 818.

In the present modification, in the case of performing the late unit activation, in the temperature raising and pressure raising process of the heat recovery steam generator 811, even in a system configuration that the three valves of the high pressure isolation valve 804, the CRH isolation valve 822 and the HRH isolation valve 832 are fully closed, the generated main steam "k" passes through the high pressure turbine bypass valve 833, the second reheater 820 and the low pressure turbine bypass valve 834 in order and is led to the steam condenser (not shown in the figure).

That is, the generated second main steam "k" surely becomes the second discharge steam "q". Therefore, in the cascade bypass manner, the flow rate of the main steam "k" before the insertion to the high pressure steam turbine 902 of the second main steam "k" is started coincides with the second discharge steam "q" measured by the measuring instrument 828. Accordingly, it can be said that the measuring instrument 828 is measuring the flow rate of the second main steam "k" when the high pressure isolation valve 804 is fully closed and the CRH isolation valve 822 is fully closed.

Also, similarly, since the three valves of the high pressure isolation valve 804, the CRH isolation valve 822 and the HRH isolation valve 832 are fully closed, the flow rate of the first main steam "n" coincides with the first discharge steam "p" measured by the measuring instrument 728. Therefore, it can be said that the measuring instrument 728 is measuring the flow rate of the first main steam "n" when the high pressure isolation valve 804 is fully closed and the CRH isolation valve 822 is fully closed.

To the determination module 651, the flow rate signal "e" indicating the flow rate of the first discharge steam "p" measured by the measuring instrument 728 is inputted, and the flow rate signal "m" indicating the flow rate of the second discharge steam "q" measured by the measuring instrument 828 is inputted. The divider 610 acquires the main steam flow rate ratio "i" (=m÷e) by dividing the flow rate signal "e" by the flow rate signal "m". The main steam flow rate ratio "i" is outputted from the divider 610 and inputted to the moving time average operator 612.

Also, to the controller 652, the opening degree signal "d" indicating the opening degree of the CRH isolation valve (second valve) 822, which is measured by the opening degree meter 815, is inputted. The comparator 615 compares the inputted target opening degree "r" with the inputted opening degree signal "d", and when the target opening degree "r" is larger than the opening degree signal "d" (that is, when it is r>d), outputs the valve opening command "v" to the CRH isolation valve 822.

The AND gate 619 generates the valve opening command "a" to the CRH isolation valve 822 by ANDing the opening degree increase command "v" and the pulse signal "b". Then, the generated valve opening command "a" is outputted to the CRH isolation valve 822.

Before the insertion is started, as illustrated in FIG. 6, the high pressure isolation valve 704, the CRH isolation valve 722, and the HRH isolation valve 732 are fully open at the 100% opening degree. On the other hand, the high pressure turbine bypass valve 733, the high pressure isolation valve 804, the CRH isolation valve 822 and the HRH isolation valve 832 are fully closed, and the high pressure turbine bypass valve 833 is at the intermediate opening degree.

Next, after the insertion is started, the control apparatus 400 performs control so as to close the high pressure turbine bypass valve 833 and to open the high pressure isolation valve (third valve) 804. After the high pressure isolation valve (third valve) 804 starts to open until it is fully opened, the valve controller 650 adjusts the CRH isolation valve (second valve) 822 so as to divide the flow rate of the discharge steam between the first unit 701 and the second unit 801 according to the flow rate ratio of the first discharge steam "p" and the second discharge steam "q" immediately before the high pressure isolation valve 804 is opened. Therefore, when the high pressure isolation valve (third valve) 804 is fully opened, the opening degree of the CRH isolation valve (second valve) 822 becomes the target opening degree "r" determined by the flow rate ratio of the first discharge steam "p" and the second discharge steam "q" immediately before the high pressure isolation valve 804 is opened.

Even in the multiaxial type combined cycle power plant of the cascade bypass manner, in all power units, the flow rate of the main steam and the discharge steam becomes equal as described above only when it is an extremely limited system configuration. For example, after the HRH isolation valve 832 is opened (that is, in the state that the two HRH isolation valves 732 and 832 are open), since division into the first unit 701 and second unit 801 from the discharge steam header 910 is performed to be the discharge steam, the flow rate of the discharge steam does not coincide with that of the main steam. Therefore, for the application of the present modification, it is needed to select a plant operation condition.

Even to the multiaxial type combined cycle power plant 3b of this cascade bypass manner, by installing the measuring instruments 718 and 818 that measure the main steam "n" and the main steam "k", the control of the first embodiment or the third embodiment can be applied.

The CRH isolation valve (second valve) 822 relating to each embodiment is not limited to the motor-operated valve, and may be the valve of another kind having a function of completely cutting off the steam when it is fully closed.

While certain embodiments have been described, these embodiments have been presented by way of example only, and are not intended to limit the scope of the inventions. Indeed, the novel apparatuses and plants described herein may be embodied in a variety of other forms; furthermore, various omissions, substitutions and changes in the form of the apparatuses and plants described herein may be made without departing from the spirit of the inventions. The accompanying claims and their equivalents are intended to cover such forms or modifications as would fall within the scope and spirit of the inventions.

The invention claimed is:

1. A plant control apparatus configured to control a combined cycle power plant comprising:
   a first superheater configured to recover heat of exhaust gas of a first gas turbine to generate first main steam;
   a second superheater configured to recover heat of exhaust gas of a second gas turbine to generate second main steam;
   a first steam turbine configured to be supplied with the first main steam and the second main steam;
   a first reheater configured to heat first discharge steam obtained by dividing discharge steam of the first steam turbine to generate first reheat steam;
   a second reheater configured to heat second discharge steam obtained by dividing the discharge steam of the first steam turbine to generate second reheat steam;
   a second steam turbine configured to be supplied with the first reheat steam and the second reheat steam after the first reheat steam and the second reheat steam are merged;
   a first valve as a motor-operated valve, configured to adjust a flow rate of the first discharge steam supplied to the first reheater or the first reheat stream discharged from the first reheater; and
   a second valve as the motor-operated valve, configured to adjust a flow rate of the second discharge steam supplied to the second reheater or the second reheat stream discharged from the second reheater,
   the plant control apparatus comprising:
   a determination module configured to obtain a flow rate ratio of a flow rate of the first main steam and a flow rate of the second main steam, obtain a flow coefficient corresponding to a valve opening degree of the first valve by using correspondence between a valve opening degree and a flow coefficient of the motor-operated valve, determine a target flow coefficient of the second valve by using the obtained flow coefficient of the first valve and the obtained flow rate ratio, and determine, as a target opening degree of the second valve, a valve opening degree of the second valve corresponding to the target flow coefficient of the second valve in the correspondence; and
   a controller configured to compare the determined target opening degree with a valve opening degree of the second valve and to perform one of an opening operation and a closing operation of the second valve in accordance with a state whether the determined target opening degree is larger or smaller than the valve opening degree of the second valve.

2. The apparatus of claim 1, wherein the determination module calculates, as a main steam average flow rate ratio, a moving time average of the flow rate ratio of the first main steam and the second main steam, and determines the target opening degree of the second valve by using the calculated main steam average flow rate ratio and the correspondence between the valve opening degree and the flow coefficient of the second valve.

3. The apparatus of claim 2, wherein the determination module determines a target flow coefficient of the second valve by using the main steam average flow rate ratio, and determines, as the target opening degree of the second valve, the valve opening degree of the second valve corresponding to the target flow coefficient of the second valve in the correspondence.

4. The apparatus of claim 1, wherein
   the combined cycle power plant further comprises a third valve provided between the second superheater and the first steam turbine and configured to adjust the flow rate of the second main steam, and the determination module is configured, in a case where the third valve is to be opened to supply the second main steam to the first steam turbine from a state that only the first main steam is supplied to the first steam turbine, to determine the target opening degree of the second valve by using the flow rate ratio when the third valve is opened and the correspondence between the valve opening degree and the flow coefficient of the second valve, before the third valve is opened to a stipulated rate, and to determine the target opening degree of the second valve by using the flow rate ratio at determination time and the correspondence between the valve opening degree and the flow coefficient of the second valve, after the third valve is opened to the stipulated rate.

5. A combined cycle power plant comprising:

a first superheater configured to recover heat of exhaust gas of a first gas turbine to generate first main steam;

a second superheater configured to recover heat of exhaust gas of a second gas turbine to generate second main steam;

a first steam turbine configured to be supplied with the first main steam and the second main steam;

a first reheater configured to heat first discharge steam obtained by dividing discharge steam of the first steam turbine to generate first reheat steam;

a second reheater configured to heat second discharge steam obtained by dividing the discharge steam of the first steam turbine to generate second reheat steam;

a second steam turbine configured to be supplied with the first reheat steam and the second reheat steam after the first reheat steam and the second reheat steam are merged;

a first valve as a motor-operated valve, configured to adjust a flow rate of the first discharge steam supplied to the first reheater or the first reheat stream discharged from the first reheater;

a second valve as the motor-operated valve, configured to adjust a flow rate of the second discharge steam supplied to the second reheater or the second reheat stream discharged from the second reheater;

a first measuring instrument configured to measure a flow rate of the first main steam;

a second measuring instrument configured to measure a flow rate of the second main steam;

an opening degree meter configured to measure a valve opening degree of the second valve;

a determination module configured to obtain a flow rate ratio of the flow rate of the first main steam measured by the first measuring instrument and the flow rate of the second main steam measured by the second measuring instrument, obtain a flow coefficient corresponding to a valve opening degree of the first valve by using correspondence between a valve opening degree and a flow coefficient of the motor-operated valve, determine a target flow coefficient of the second valve by using the obtained flow coefficient of the first valve and the obtained flow rate ratio, and determine, as a target opening degree of the second valve, a valve opening degree of the second valve corresponding to the target flow coefficient of the second valve in the correspondence; and a controller configured to compare the determined target opening degree with the measured valve opening degree of the second valve and to perform one of an operating operation and a closing operation of the second valve in accordance with a state whether the determined target opening degree is larger or smaller than the measured valve opening degree of the second valve.

* * * * *